United States Patent
Liu et al.

(10) Patent No.: US 12,513,697 B2
(45) Date of Patent: Dec. 30, 2025

(54) RESOURCE INDICATION METHOD AND COMMUNICATION APPARATUS

(71) Applicant: Huawei Technologies Co., Ltd., Shenzhen (CN)

(72) Inventors: Fengwei Liu, Chengdu (CN); Shitong Yuan, Chengdu (CN); Jing Qiu, Chengdu (CN); Yunfu Dou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 451 days.

(21) Appl. No.: 17/943,497

(22) Filed: Sep. 13, 2022

(65) Prior Publication Data
US 2023/0007645 A1    Jan. 5, 2023

Related U.S. Application Data

(63) Continuation of application No. PCT/CN2020/079364, filed on Mar. 13, 2020.

(51) Int. Cl.
*H04W 72/20* (2023.01)

(52) U.S. Cl.
CPC .................................. *H04W 72/20* (2023.01)

(58) Field of Classification Search
CPC ... H04B 7/0639; H04B 7/0695; H04W 24/02; H04W 72/20; H04W 72/541
See application file for complete search history.

(56) References Cited

U.S. PATENT DOCUMENTS

| | | | |
|---|---|---|---|
| 2010/0272009 A1 | 10/2010 | Cheng et al. | |
| 2020/0128622 A1* | 4/2020 | Song | H04B 17/327 |
| 2020/0374890 A1* | 11/2020 | Wu | H04J 11/0023 |
| 2021/0153189 A1 | 5/2021 | Jo et al. | |
| 2021/0212026 A1* | 7/2021 | Peng | H04W 28/0268 |
| 2021/0266128 A1 | 8/2021 | Zhang et al. | |
| 2022/0279310 A1* | 9/2022 | Xiao | H04W 4/023 |

(Continued)

FOREIGN PATENT DOCUMENTS

| | | |
|---|---|---|
| CN | 108934030 A | 12/2018 |
| CN | 110740020 A | 1/2020 |
| EP | 3648529 A1 | 5/2020 |

(Continued)

OTHER PUBLICATIONS

Qualcomm Incorporated, "Enhancements to support NR backhaul links," 3GPP TSG RAN WG1 Meeting #95 R1-1813417, Nov. 16, 2018, 21 pages.

(Continued)

*Primary Examiner* — Timothy X Pham
(74) *Attorney, Agent, or Firm* — Conley Rose, P.C.

(57) ABSTRACT

A resource indication method and a communication apparatus, where the method includes: The second node receives first indication information from the first node, where the first indication information includes first resource information, and the first resource information is associated with a first reference signal. The second node determines the first resource information based on the first indication information, where the first resource information is for limiting sending of a to-be-sent signal on a first resource indicated by the first resource information.

20 Claims, 11 Drawing Sheets

(56) References Cited

U.S. PATENT DOCUMENTS

2022/0369236 A1\* 11/2022 Chen ................... H04W 52/242
2024/0114494 A1\* 4/2024 Kim ................. H04W 72/0453

FOREIGN PATENT DOCUMENTS

WO        2019208994 A1    10/2019
WO        2020032580 A1     2/2020

OTHER PUBLICATIONS

3GPP TS 38.213 V16.0.0 "3rd Generation Partnership Project; Technical Specification Group Radio Access Network; NR; Physical layer procedures for control (Release 16)," Dec. 2019, 146 pages.

3GPP TR 38.874 V16.0.0 "3rd Generation Partnership Project; Technical Specification Group Radio Access Network; NR; Study on Integrated Access and Backhaul; (Release 16)," Dec. 2018, 111 pages.

Huawei, et al "On cross-link interference in IAB," 3GPP TSG RAN WG 1 Meeting #94bis, Chengdu, China, Oct. 8-12, 2018, R1-1810134, 10 pages.

\* cited by examiner

RESOURCE INDICATION METHOD AND COMMUNICATION APPARATUS

CROSS-REFERENCE TO RELATED APPLICATIONS

This is a continuation of Int'l Patent App. No. PCT/CN2020/079364, filed on Mar. 13, 2020, which is incorporated by reference.

TECHNICAL FIELD

This disclosure relates to the field of communication technologies, and in particular, to a resource indication method and a communication apparatus.

BACKGROUND

With continuous development of mobile communication technologies, spectrum resources become increasingly insufficient. To improve spectrum utilization, base station deployment density may be increased. As the base station deployment density increases, a relay node (RN) is introduced to reduce costs for deploying optical fibers between a base station and a core network. The relay node establishes a connection to the core network based on a wireless backhaul link, to further reduce the deployment costs of optical fibers. Usually, the relay node may establish a wireless backhaul link with one or more upper-level nodes, and access the core network through the upper-level node. The relay node may provide services for one or more lower-level nodes.

An in-band relay solution is a relay solution in which a backhaul link and an access link share a same frequency band, and has advantages such as high spectrum efficiency and low deployment costs. Integrated access and backhaul (IAB) is an in-band relay solution. In this in-band relay solution, a relay node may be referred to as an IAB node. When IAB nodes are densely deployed, interference exists between the IAB nodes.

Therefore, how to reduce mutual interference between the IAB nodes is an urgent technical problem to be resolved.

SUMMARY

This disclosure provides a resource indication method and a communication apparatus, to reduce mutual interference between IAB nodes, and therefore improve network performance and spectrum efficiency.

A first aspect provides a resource indication method. The method is applied to a communication system including a first node, at least one second node, and a third node. The first node is an upper-level node of the at least one second node, and the at least one second node is an interference node of the third node. The method provided in the first aspect may be performed by the second node, or may be performed by a component (for example, a processor, a chip, or a chip system) of the second node. The method may include the following.

The second node receives first indication information from the first node, where the first indication information includes first resource information, and the first resource information is associated with a first reference signal. The second node determines the first resource information based on the first indication information, where the first resource information is for limiting sending of a to-be-sent signal by the second node on a first resource indicated by the first resource information.

The communication system may be an IAB system, the first node is an upper-level node (or referred to as an IAB donor node) of the second node, and the second node and the third node may be IAB nodes or terminal devices. The first reference signal may be understood as a reference signal that is sent by the second node and that may cause interference to the third node.

According to the first aspect, the second node limits, using the first indication information, the sending of the to-be-sent signal by the second node on the first resource, where the to-be-sent signal may cause interference to the third node. Therefore, mutual interference between IAB nodes can be reduced, and network performance and spectrum efficiency can be improved.

In a possible implementation, that the first resource information is for limiting sending of a to-be-sent signal on a first resource includes: The first resource information indicates that the to-be-sent signal is not allowed to be sent on the first resource. That the to-be-sent signal is not allowed to be sent on the first resource may also be described as that the first resource is unavailable for sending of the to-be-sent signal by the second node, or the like. This can prevent the second node from sending, on the first resource, the to-be-sent signal that may cause interference to the third node, to reduce the mutual interference between the IAB nodes.

In a possible implementation, that the first resource information is for limiting sending of a to-be-sent signal on a first resource includes: sending the to-be-sent signal based on the first resource at transmit power less than a threshold, such that the to-be-sent signal sent by the second node based on the first resource may not reach the third node, and therefore the mutual interference between the IAB nodes is reduced; sending the to-be-sent signal based on the first resource at transmit power less than transmit power for sending a second reference signal, such that the transmit power of the to-be-sent signal is reduced, and therefore the mutual interference between the IAB nodes is reduced; or sending the to-be-sent signal based on an offset threshold to transmit power for sending a second reference signal and based on the first resource, such that the to-be-sent signal sent by the second node based on the first resource may not reach the third node or transmit power of the to-be-sent signal may be reduced, and therefore the mutual interference between the IAB nodes is reduced.

In a possible implementation, the first resource information includes second indication information, the second indication information indicates that the first reference signal and the to-be-sent signal have a quasi co-location (QCL) relationship, and the QCL relationship is for limiting the sending of the to-be-sent signal by the second node on the first resource, such that the interference of the to-be-sent signal to the third node is avoided or reduced.

In a possible implementation, the first resource information includes first space domain resource information, to limit sending of the to-be-sent signal by the second node on a first space domain resource. For the to-be-sent signal, the first space domain resource is limited to be unavailable, but another resource, for example, a time domain resource or a frequency domain resource, is available, such that a network capacity and the spectrum efficiency can be improved.

In a possible implementation, the first resource information includes first space domain resource information and first time domain resource information, to limit a first space domain resource to be unavailable when the second node uses a first time domain resource. For the to-be-sent signal, the first space domain resource is limited to be unavailable when the first time domain resource is used, but a frequency domain resource is not limited, and another space domain resource may be used on the first time domain resource to send the to-be-sent signal, such that a network capacity and frequency efficiency can be improved.

In a possible implementation, the first resource information includes first space domain resource information and first frequency domain resource information, to limit a first space domain resource to be unavailable when the second node uses a first frequency domain resource. For the to-be-sent signal, the first space domain resource is limited to be unavailable when the first frequency domain resource is used, but a time domain resource is not limited, and another space domain resource may be used on the first frequency domain resource to send the to-be-sent signal, such that a network capacity can be improved.

In a possible implementation, the first resource information includes first space domain resource information, first time domain resource information, and first frequency domain resource information, to limit a first space domain resource to be unavailable when the second node uses a first time domain resource and a first frequency domain resource. For the to-be-sent signal, the first space domain resource is limited to be unavailable when the first time domain resource and the first frequency domain resource are used. Another space domain resource may be used on the first time domain resource and the first frequency domain resource to send the to-be-sent signal, such that a network capacity can be improved.

In a possible implementation, the first space domain resource information may include one or more of the following: a port identifier and a panel identifier. A port may support one or more beams, and a panel may support one or more beams. The second node may send the to-be-sent signal without using the one or more supported beams, or send the to-be-sent signal in a power-limited manner using the one or more supported beams, to reduce the mutual interference between the IAB nodes, and improve the network performance and the frequency efficiency.

In a possible implementation, the first space domain resource information may include one or more of the following: a peer device identifier of the second node and a transmission link identifier. The peer device identifier may be an IAB node identifier or a terminal device identifier. The IAB node identifier may be a node identifier of one IAB node, or may be a node group identifier of a group of IAB nodes. The terminal device identifier may be a device identifier of one terminal device, or may be a device group identifier of a group of terminal devices. The transmission link identifier is for identifying a link for transmitting the first reference signal, and the link may be a link including a node set. An identifier may be configured for the node set, and the identifier may come from the first node. The node set may include one or more nodes. The node may be an IAB node or a terminal device.

In a possible implementation, that the first resource information is associated with a first reference signal may be: The first resource information is associated with a device corresponding to the first reference signal, or the first resource information is associated with a transmission link corresponding to the first reference signal.

The second node may not send the to-be-sent signal on the transmission link identified by the transmission link, or may not send the to-be-sent signal to a peer device identified by the peer device identifier. Alternatively, the second node may send the to-be-sent signal on the transmission link in the power-limited manner, or may send the to-be-sent signal to the peer device in the power-limited manner. Therefore, the mutual interference between the IAB nodes is reduced, and the network performance and the frequency efficiency are improved.

In a possible implementation, the first indication information further includes a cell identifier and/or a reference signal identifier, and the cell identifier and/or the reference signal identifier are/is for identifying the first reference signal, such that the second node learns of a specific reference signal that is of a specific cell and that may cause interference to the third node.

A second aspect provides a resource indication method. The method is applied to a communication system including a first node, at least one second node, and a third node. The first node is an upper-level node of the at least one second node, and the at least one second node is an interference node of the third node. The method provided in the second aspect may be performed by the first node, or may be performed by a component (for example, a processor, a chip, or a chip system) of the first node. The method may include:

The first node determines first indication information; and sends the first indication information to the at least one second node, where the first indication information includes first resource information, the first resource information is associated with a first reference signal, and the first resource information is for limiting sending of a to-be-sent signal by the at least one second node on a first resource indicated by the first resource information.

According to the second aspect, the first node sends the first indication information to the at least one second node, to limit the sending of the to-be-sent signal by the second node on the first resource, where the to-be-sent signal may cause interference to the third node. Therefore, mutual interference between IAB nodes can be reduced, and network performance and spectrum efficiency can be improved.

In a possible implementation, the first node may determine the first indication information in a measurement reporting process.

In a possible implementation, that the first resource information is for limiting sending of a to-be-sent signal on a first resource includes: The first resource information indicates that the to-be-sent signal is not allowed to be sent on the first resource. This can prevent the second node from sending, on the first resource, the to-be-sent signal that may cause interference to the third node, to reduce the mutual interference between the IAB nodes.

In a possible implementation, that the first resource information is for limiting sending of a to-be-sent signal on a first resource includes: sending the to-be-sent signal based on the first resource at transmit power less than a threshold, such that the to-be-sent signal sent by the at least one second node based on the first resource may not reach the third node, and therefore the mutual interference between the IAB nodes is reduced; sending the to-be-sent signal based on the first resource at transmit power less than transmit power for sending a second reference signal, such that the transmit power of the to-be-sent signal is reduced, and therefore the mutual interference between the IAB nodes is reduced; or sending the to-be-sent signal based on an offset threshold to transmit power for sending a second reference signal and based on the first resource, such that the to-be-sent signal sent by the at least one second node based on the first resource may not reach the third node or transmit power of the to-be-sent signal may be reduced, and therefore the mutual interference between the IAB nodes is reduced.

In a possible implementation, the first resource information includes second indication information, the second indication information indicates that the first reference signal and the to-be-sent signal have a QCL relationship, and the QCL relationship is for limiting the sending of the to-be-sent signal by the at least one second node on the first resource, such that the interference of the to-be-sent signal to the third node is avoided or reduced.

In a possible implementation, the first resource information includes first space domain resource information, to limit sending of the to-be-sent signal by the at least one second node on a first space domain resource. For the to-be-sent signal, the first space domain resource is limited to be unavailable, but another resource, for example, a time domain resource or a frequency domain resource, is available, such that a network capacity and the spectrum efficiency can be improved.

In a possible implementation, the first resource information includes first space domain resource information and first time domain resource information, to limit a first space domain resource to be unavailable when the at least one second node uses a first time domain resource. For the to-be-sent signal, the first space domain resource is limited to be unavailable when the first time domain resource is used, but a frequency domain resource is not limited, and another space domain resource may be used on the first time domain resource to send the to-be-sent signal, such that a network capacity and frequency efficiency can be improved.

In a possible implementation, the first resource information includes first space domain resource information and first frequency domain resource information, to limit a first space domain resource to be unavailable when the at least one second node uses a first frequency domain resource. For the to-be-sent signal, the first space domain resource is limited to be unavailable when the first frequency domain resource is used, but a time domain resource is not limited, and another space domain resource may be used on the first frequency domain resource to send the to-be-sent signal, such that a network capacity can be improved.

In a possible implementation, the first resource information includes first space domain resource information, first time domain resource information, and first frequency domain resource information, to limit a first space domain resource to be unavailable when the at least one second node uses a first time domain resource and a first frequency domain resource. For the to-be-sent signal, the first space domain resource is limited to be unavailable when the first time domain resource and the first frequency domain resource are used. Another space domain resource may be used on the first time domain resource and the first frequency domain resource to send the to-be-sent signal, such that a network capacity can be improved.

In a possible implementation, the first space domain resource information may include one or more of the following: a port identifier and a panel identifier. A port may support one or more beams, and a panel may support one or more beams. Any one of the at least one second node may send the to-be-sent signal without using the one or more supported beams, or send the to-be-sent signal in a power-limited manner using the one or more supported beams, to reduce the mutual interference between the IAB nodes, and improve the network performance and the frequency efficiency.

In a possible implementation, the first space domain resource information may include one or more of the following: a peer device identifier of the at least one second node and a transmission link identifier. The peer device identifier may be an IAB node identifier or a terminal device identifier. The IAB node identifier may be a node identifier of one IAB node, or may be a node group identifier of a group of IAB nodes. The terminal device identifier may be a device identifier of one terminal device, or may be a device group identifier of a group of terminal devices. The transmission link identifier is for identifying a link for transmitting the first reference signal, and the link may be a link including a node set. An identifier may be configured for the node set, and the identifier may come from the first node. The node set may include one or more nodes. The node may be an IAB node or a terminal device.

In a possible implementation, that the first resource information is associated with a first reference signal may be: The first resource information is associated with a device corresponding to the first reference signal, or the first resource information is associated with a transmission link corresponding to the first reference signal.

Any one of the at least one second node may not send the to-be-sent signal on the transmission link identified by the transmission link, or may not send the to-be-sent signal to a peer device identified by the peer device identifier. Alternatively, any one of the at least one second node may send the to-be-sent signal on the transmission link in the power-limited manner, or may send the to-be-sent signal to the peer device in the power-limited manner. Therefore, the mutual interference between the IAB nodes is reduced, and the network performance and the frequency efficiency are improved.

In a possible implementation, the first indication information further includes a cell identifier and/or a reference signal identifier, and the cell identifier and/or the reference signal identifier are/is for identifying the first reference signal, such that the second node learns of a specific reference signal that is of a specific cell and that may cause interference to the third node.

A third aspect provides a resource indication method. The method is applied to a communication system including a first node, at least one second node, and a third node. The first node is an upper-level node of the at least one second node, and the at least one second node is an interference node of the third node. The method provided in the third aspect may be performed by the third node, or may be performed by a component (for example, a processor, a chip, or a chip system) of the third node. The method may include:

The third node receives third indication information from the first node.

In a possible implementation, the third indication information indicates that a third reference signal and a signal have a QCL relationship. Whether the third node avoids receiving the signal that may cause interference to the third node and how the third node avoids receiving the signal are autonomously determined by the third node, and are not limited by the third indication information, such that an autonomous decision-making capability of the third node can be improved.

In a possible implementation, the third indication information includes second resource information, and the second resource information is associated with the third reference signal. The third node determines the second resource information based on the third indication information, where the second resource information is for limiting receiving of the signal by the third node on a second resource indicated by the second resource information, such that the third node can avoid receiving the signal that may cause interference to the third node.

In a possible implementation, that the second resource information is for limiting receiving of the signal by the third node on a second resource indicated by the second resource information includes: The third node is not allowed to receive the signal on the second resource indicated by the second resource information.

In a possible implementation, the second resource information includes fourth indication information, the fourth indication information indicates that the third reference signal and the signal have a QCL relationship, and the QCL relationship is for limiting the receiving of the signal on the second resource indicated by the second resource information.

In a possible implementation, the second resource information further includes one or more of the following: second time domain resource information, second frequency domain information, and second space domain resource information.

In a possible implementation, the second space domain resource information includes one or more of the following: a port identifier and a panel identifier.

In a possible implementation, the second space domain resource information includes one or more of the following: a peer device identifier of the third node and a transmission link identifier.

In a possible implementation, that the second resource information is associated with the third reference signal includes one or more of the following: The second resource information is associated with a device corresponding to the third reference signal; and the second resource information is associated with a transmission link corresponding to the third reference signal.

In a possible implementation, the third indication information further includes a scheduling mode of the third reference signal, and the scheduling mode is semi-static scheduling or passive scheduling.

For implementations of the third aspect that are similar to those of the first aspect, refer to descriptions of the implementations of the first aspect.

A fourth aspect provides a resource indication method. The method is applied to a communication system including a first node, at least one second node, and a third node. The first node is an upper-level node of the at least one second node, and the at least one second node is an interference node of the third node. The method provided in the fourth aspect may be performed by the first node, or may be performed by a component (for example, a processor, a chip, or a chip system) of the first node. The method may include:

The first node determines third indication information.

The first node sends the third indication information to the third node.

In a possible implementation, the third indication information indicates that a third reference signal and a signal have a quasi co-location relationship. Whether the third node avoids receiving the signal that may cause interference to the third node and how the third node avoids receiving the signal are autonomously determined by the third node, and are not limited by the third indication information, such that an autonomous decision-making capability of the third node can be improved.

In a possible implementation, the third indication information includes second resource information, and the second resource information is associated with the third reference signal. The third node determines the second resource information based on the third indication information, where the second resource information is for limiting receiving of the signal by the third node on a second resource indicated by the second resource information, such that the third node can avoid receiving the signal that may cause interference to the third node.

In a possible implementation, that the second resource information is for limiting receiving of the signal by the third node on a second resource indicated by the second resource information includes: The third node is not allowed to receive the signal on the second resource indicated by the second resource information.

In a possible implementation, the second resource information includes fourth indication information, the fourth indication information indicates that the third reference signal and the signal have a QCL relationship, and the QCL relationship is for limiting the receiving of the signal on the second resource indicated by the second resource information.

In a possible implementation, the second resource information further includes one or more of the following: second time domain resource information, second frequency domain information, or second space domain resource information.

In a possible implementation, the second space domain resource information includes one or more of the following: a port identifier or a panel identifier.

In a possible implementation, the second space domain resource information includes one or more of the following: a peer device identifier of the third node or a transmission link identifier.

In a possible implementation, that the second resource information is associated with the third reference signal includes one or more of the following: The second resource information is associated with a device corresponding to the third reference signal; or the second resource information is associated with a transmission link corresponding to the third reference signal.

In a possible implementation, the third indication information further includes a scheduling mode of the third reference signal, and the scheduling mode is semi-static scheduling or passive scheduling.

A fifth aspect provides a communication apparatus. The communication apparatus may be a second node, an apparatus in the second node, or an apparatus that can be used together with the second node. The communication apparatus has some or all functions of the second node in the method example in the first aspect. For example, the functions of the second node may include functions in some or all embodiments, or may include a function of separately implementing any embodiment. The function may be implemented by hardware, or may be implemented by hardware by executing corresponding software. The hardware or software includes one or more units or modules corresponding to the foregoing function.

In a possible design, a structure of the second node may include a processing unit and a transceiver unit. The processing unit is configured to support the second node in performing a corresponding function in the method provided in the first aspect. The transceiver unit is configured to support communication between the second node and another device. The other device may be a first node, a third node, or the like. The second node may further include a storage unit. The storage unit is configured to be coupled to the processing unit and the transceiver unit, and stores program instructions and data that are necessary for the second node.

In an implementation, the second node includes the processing unit and the transceiver unit.

The transceiver unit is configured to receive first indication information from the first node, where the first indication information includes first resource information, and the first resource information is associated with a first reference signal.

The processing unit is configured to determine the first resource information based on the first indication information, where the first resource information is for limiting sending of a to-be-sent signal by the second node on a first resource indicated by the first resource information.

For example, the processing unit may be a processor, the transceiver unit may be a transceiver, and the storage unit may be a memory.

In an implementation, the second node includes the processor and the transceiver.

The transceiver is configured to receive first indication information from the first node, where the first indication information includes first resource information, and the first resource information is associated with a first reference signal.

The processor is configured to determine the first resource information based on the first indication information, where the first resource information is for limiting sending of a to-be-sent signal by the second node on a first resource indicated by the first resource information.

In an implementation process, the processor may be configured to perform the method provided in the first aspect, for example, but not limited to, baseband-related processing, and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more and more components can be integrated on a same chip. For example, the digital baseband processor and a plurality of application processors (for example, but not limited to, a graphics processor and a multimedia processor) may be integrated on a same chip. Such a chip may be referred to as a system on chip (SoC). Whether the components are independently disposed on different chips or are integrated and disposed on one or more chips usually depends on specific requirements of a product design. An implementation form of the foregoing components is not limited.

A sixth aspect provides a processor. The processor is configured to perform the method provided in the first aspect. In a process of performing the method provided in the first aspect, a process of sending the foregoing information or data and a process of receiving the foregoing information or data may be understood as a process in which the processor outputs the foregoing information or data and a process in which the processor receives the foregoing input information or data. For example, when outputting the information or data, the processor outputs the information or data to a transceiver, such that the transceiver transmits the information or data. Further, after the information or data is output by the processor, other processing may further need to be performed on the information or data before the information or data arrives at the transceiver. Similarly, when the processor receives the input information or data, the transceiver receives the information or data and inputs the information or data into the processor. Further, after the transceiver receives the information or data, other processing may need to be performed on the information or data before the information or data is input into the processor.

Based on the foregoing principle, for example, the receiving first indication information mentioned in the method provided in the first aspect may be understood as that the transceiver inputs the received first indication information into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In an implementation process, the processor may be a processor specially configured to perform these methods, or a processor, for example, a general-purpose processor, that executes computer instructions in a memory to perform these methods. The memory may be a non-transitory memory, for example, a read-only memory (ROM). The memory and the processor may be integrated on a same chip, or may be separately disposed on different chips. A type of the memory and a manner of disposing the memory and the processor are not limited.

A seventh aspect provides a chip system. The chip system includes a processor and an interface. The chip system may be deployed in a second node.

In a possible design, the interface is configured to receive first indication information, and the processor is configured to determine first resource information based on the first indication information, where the first resource information is for limiting sending of a to-be-sent signal on a first resource indicated by the first resource information.

An eighth aspect provides a computer-readable storage medium. The computer-readable storage medium is configured to store a computer program used by the foregoing second node, and the computer program includes a program for performing the method according to the first aspect.

A ninth aspect provides a computer program product including instructions. When the computer program product runs on a computer, the computer is enabled to perform the method according to the first aspect.

A tenth aspect provides a computer program including instructions. When the computer program is run on a computer, the computer is enabled to perform the method according to the first aspect.

An eleventh aspect provides a communication apparatus. The communication apparatus may be a first node, an apparatus in the first node, or an apparatus that can be used together with the first node. The communication apparatus has some or all functions of the first node in the method example in the second aspect or the fourth aspect. For example, the functions of the first node may include functions in some or all embodiments, or may include a function of separately implementing any embodiment. The function may be implemented by hardware, or may be implemented by hardware by executing corresponding software. The hardware or software includes one or more units or modules corresponding to the foregoing function.

In a possible design, a structure of the first node may include a processing unit and a transceiver unit. The processing unit is configured to support the first node in performing a corresponding function in the method provided in the second aspect or the fourth aspect. The transceiver unit is configured to support communication between the first node and another device. The other device may be a second node, a third node, or the like. The first node may further include a storage unit. The storage unit is configured to be coupled to the processing unit and the transceiver unit, and stores program instructions and data that are necessary for the first node.

In an implementation, the first node includes the processing unit and the transceiver unit.

The processing unit is configured to determine first indication information.

The transceiver unit is configured to send the first indication information to at least one second node, where the first indication information includes first resource information, the first resource information is associated with a first reference signal, and the first resource information is for limiting sending of a to-be-sent signal by the at least one second node on a first resource indicated by the first resource information.

For example, the processing unit may be a processor, the transceiver unit may be a transceiver, and the storage unit may be a memory.

In an implementation, the first node includes the processor and the transceiver.

The processor is configured to determine first indication information.

The transceiver is configured to send the first indication information to the second node, where the first indication information includes first resource information, the first resource information is associated with a first reference signal, and the first resource information is for limiting sending of a to-be-sent signal by the second node on a first resource indicated by the first resource information.

In an implementation process, the processor may be configured to perform the method provided in the second aspect or the fourth aspect, for example, but not limited to, baseband-related processing, and the transceiver may be configured to perform, for example, but not limited to, radio frequency receiving and sending.

A twelfth aspect provides a processor. The processor is configured to perform the method provided in the second aspect or the fourth aspect. In a process of performing the method provided in the second aspect or the fourth aspect, a process of sending the foregoing information or data and a process of receiving the foregoing information or data may be understood as a process in which the processor outputs the foregoing information or data and a process in which the processor receives the foregoing input information or data.

A thirteenth aspect provides a chip system. The chip system includes a processor and an interface. The chip system may be deployed in a first node.

In a possible design, the processor is configured to: determine first indication information, and send the first indication information to a second node through the interface.

A fourteenth aspect provides a computer-readable storage medium. The computer-readable storage medium is configured to store a computer program used by the foregoing first node, and the computer program includes a program for performing the method according to the second aspect or the fourth aspect.

A fifteenth aspect provides a computer program product including instructions. When the computer program product runs on a computer, the computer is enabled to perform the method according to the second aspect or the fourth aspect.

A sixteenth aspect provides a computer program including instructions. When the computer program is run on a computer, the computer is enabled to perform the method according to the second aspect or the fourth aspect.

A seventeenth aspect provides a communication apparatus. The communication apparatus may be a third node, an apparatus in the third node, or an apparatus that can be used together with the third node. The communication apparatus has some or all functions of the third node in the method example in the third aspect. For example, the functions of the third node may include functions in some or all embodiments, or may include a function of separately implementing any embodiment. The function may be implemented by hardware, or may be implemented by hardware by executing corresponding software. The hardware or software includes one or more units or modules corresponding to the foregoing function.

In a possible design, a structure of the third node may include a processing unit and a transceiver unit. The processing unit is configured to support the third node in performing a corresponding function in the method provided in the third aspect. The transceiver unit is configured to support communication between the third node and another device. The other device may be a first node, a second node, or the like. The third node may further include a storage unit. The storage unit is configured to be coupled to the processing unit and the transceiver unit, and stores program instructions and data that are necessary for the third node.

In an implementation, the third node includes the processing unit and the transceiver unit.

The transceiver unit is configured to receive third indication information from the first node, where the third indication information includes second resource information, and the second resource information is associated with a first reference signal.

The processing unit is configured to determine the second resource information based on the third indication information, where the second resource information is for limiting receiving of a signal by the third node on a second resource indicated by the second resource information.

For example, the processing unit may be a processor, the transceiver unit may be a transceiver, and the storage unit may be a memory.

In an implementation, the third node includes the processor and the transceiver.

The transceiver is configured to receive third indication information from the first node, where the third indication information includes second resource information, and the second resource information is associated with a first reference signal.

The processor is configured to determine the second resource information based on the third indication information, where the second resource information is for limiting receiving of a signal by the third node on a second resource indicated by the second resource information.

In an implementation process, the processor may be configured to perform the method provided in the third aspect, for example, but not limited to, baseband-related processing, and the transceiver may be configured to perform, for example, but not limited to, radio frequency receiving and sending.

An eighteenth aspect provides a processor. The processor is configured to perform the method provided in the third aspect. In a process of performing the method provided in the third aspect, a process of sending the foregoing information or data and a process of receiving the foregoing information or data may be understood as a process in which the processor outputs the foregoing information or data and a process in which the processor receives the foregoing input information or data.

A nineteenth aspect provides a chip system. The chip system includes a processor and an interface. The chip system may be deployed in a third node.

In a possible design, the interface is configured to receive third indication information, and the processor is configured to determine second resource information based on the third indication information, where the second resource information is for limiting receiving of a signal by the third node on a second resource indicated by the second resource information.

A twentieth aspect provides a computer-readable storage medium. The computer-readable storage medium is configured to store a computer program used by the foregoing third node, and the computer program includes a program for performing the method according to the third aspect.

A twenty-first aspect provides a computer program product including instructions. When the computer program product runs on a computer, the computer is enabled to perform the method according to the third aspect.

A twenty-second aspect provides a computer program including instructions. When the computer program is run on a computer, the computer is enabled to perform the method according to the third aspect.

A twenty-third aspect provides a communication system. The communication system includes a first node, at least one second node, and a third node. The first node is an upper-level node of the at least one second node, and the at least one second node is an interference node of the third node.

DETAILED DESCRIPTION OF EMBODIMENTS

Figure 1:
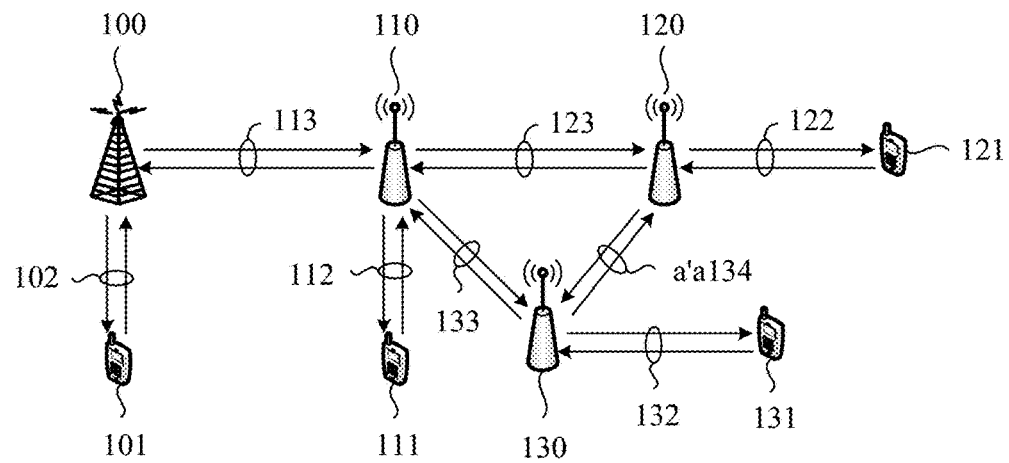
FIG. 1 is an example diagram of an IAB system.

To better understand technical solutions provided, technical terms in this disclosure are first described.

(1) Quasi Co-Location (QCL)

A QCL relationship indicates that a plurality of resources have one or more same or similar communication features. For example, if two antenna ports have a quasi co-location relationship, a large-scale channel feature of transmitting a signal by one antenna port may be deduced from a large-scale channel feature of transmitting a signal by the other antenna port. Signals corresponding to the antenna ports that have the QCL relationship have a same parameter, or a parameter of one antenna port may be used to determine a parameter of the other antenna port that has the QCL relationship with the antenna port, or the two antenna ports have a same parameter, or a parameter difference between the two antenna ports is less than a preset value. The parameter may include one or more of the following large-scale channel parameters: a delay spread, a Doppler spread, a Doppler shift, an average delay, an average gain, and a spatial receive (Rx) parameter. The spatial receive parameter may include one or more of an angle of arrival (AoA), a dominant angle of arrival (Dominant AoA), an average angle of arrival (Average AoA), an angle of departure (AoD), a channel correlation matrix, a power angle spread spectrum of the angle of arrival, an average angle of departure (Average AoD), a power angle spread spectrum of the angle of departure, a transmit channel correlation, a receive channel correlation, transmit beamforming, receive beamforming, a spatial channel correlation, a spatial filter, a spatial filtering parameter, or the like.

(2) IAB System

In an in-band relay solution, usually, a relay node may establish a wireless backhaul link with one or more upper-level nodes, and access a core network through the upper-level node. The upper-level node may control (for example, perform data scheduling, timing modulation, and power control on) the relay node using a plurality of types of signaling. The relay node may provide services for one or more lower-level nodes. An in-band relay solution in a new radio (NR) system may be referred to as an IAB solution. In an IAB system, a relay node may be referred to as an IAB node, an upper-level node of the IAB node may be a base station or another IAB node, and a lower-level node of the IAB node may be a terminal device or another IAB node.

An upper-level node is a node that provides a resource for a wireless backhaul link. For example, a base station may be an upper-level node of an IAB node. A lower-level node is a node that transmits data to a network using a wireless backhaul link resource and/or receives data from the network. For example, a terminal device may be a lower-level node of an IAB node. The network may be a core network or another network above an access network, for example, the internet or a dedicated network. The upper-level node may also be described as a parent node, an upstream node, or the like, and the lower-level node may also be described as a child node, a downstream node, or the like.

Refer to an example diagram of an IAB system shown in FIG. 1. The IAB system may include at least one base station 100 and one or more IAB nodes 110. The base station 100 may provide services for one or more terminal devices 101, and may also provide services for the one or more IAB nodes 110. The IAB node 110 may provide services for one or more terminal devices 111. Usually, the base station 100 may be referred to as a donor base station (e.g., a donor next generation NodeB (DgNB)), and the IAB node 110 is connected to the base station 100 through a wireless backhaul link 113. The donor base station may also be described as a donor node, a donor node, an IAB donor, an IAB donor node, or the like. An example in which the donor base station is described as the IAB donor is used.

The IAB system may further include a plurality of other IAB nodes, for example, an IAB node 120 and an IAB node 130. The IAB node 120 is connected to the IAB node 110 through a wireless backhaul link 123, to access a network. The IAB node 130 is connected to the IAB node 110 through a wireless backhaul link 133, to access the network. The IAB node 120 may provide services for one or more terminal devices 121, and the IAB node 130 may provide services for one or more terminal devices 131. In FIG. 1, all of the IAB node 110, the IAB node 120, and the IAB node 130 may access the network through wireless backhaul links. A wireless backhaul link is viewed from a perspective of an IAB node. For example, the wireless backhaul link 113 is a backhaul link of the IAB node 110, the wireless backhaul link 123 is a backhaul link of the IAB node 120, and the wireless backhaul link 133 is a backhaul link of the IAB node 130.

An IAB node may directly access the network. For example, the IAB node 110 accesses the network through the wireless backhaul link 113. Alternatively, an IAB node may access the network through a plurality of levels of relay nodes. For example, the IAB node 120 is first connected to the IAB node 110 through the wireless backhaul link 123, and then accesses the network through the wireless backhaul link 113 of the IAB node 110. It should be understood that the IAB node is only used for description, but this does not mean that the solutions are used only in an NR scenario. The IAB node may generally refer to any node or device that has a relay function. It should be understood that use of the IAB node and use of a relay node have a same meaning.

FIG. 1 relates to two types of transmission links. One is a wireless access link, and the other is a wireless backhaul link.

The wireless access link may also be described as an access link, and refers to a link between a terminal device and an IAB node or an IAB donor. Alternatively, the wireless access link includes a wireless link used when a node communicates with a lower-level node of the node. The wireless access link includes an uplink access link and a downlink access link. The uplink access link is also referred to as uplink transmission of the access link, and the downlink access link is also referred to as downlink transmission of the access link.

The wireless backhaul link may also be described as a backhaul (BH) link, and refers to a link between an IAB node and an IAB child node or between an IAB node and an IAB parent node. For example, for the node 110, an IAB child node of the node 110 is the IAB node 120, and an IAB parent node of the node 110 is the base station 100. The wireless backhaul link includes a downlink transmission link to the IAB child node or the IAB parent node, and an uplink transmission link to the IAB child node or the IAB parent node. For the IAB node, transmitting data to the IAB parent node of the IAB node or receiving uplink data transmitted by the IAB child node of the IAB node is referred to as uplink transmission of the backhaul link. For the IAB node, receiving data transmitted by the IAB parent node of the IAB node or transmitting data to the IAB child node of the IAB node is referred to as downlink transmission of the backhaul link.

To distinguish a terminal device from the IAB node, a backhaul link between the IAB node and the IAB parent node of the IAB node is also referred to as an upper-level backhaul link (parent BH link), and a backhaul link between the IAB node and the IAB child node of the IAB node is referred to as a lower-level backhaul link (child BH link).

Usually, a lower-level node may be considered as a terminal device of an upper-level node. It should be understood that, that one IAB node is connected to one upper-level node is used as an example in the IAB system shown in FIG. 1. During actual application, to improve reliability of a wireless backhaul link, one IAB node, for example, the IAB node 120, may be connected to a plurality of upper-level nodes. In other words, a plurality of upper-level nodes may provide services for one IAB node. For example, in FIG. 1, the IAB node 130 may be further connected to the IAB node 120 through a wireless backhaul link a'a134. In other words, both the IAB node 110 and the IAB node 120 may be considered as upper-level nodes of the IAB node 130.

In FIG. 1, wireless links 102, 112, 122, 132, 113, 123, 133, and a'a134 may be bidirectional links, and each include an uplink transmission link and a downlink transmission link. In particular, wireless backhaul links 113, 123, 133, and a'a134 may be used by upper-level nodes to provide services for lower-level nodes. For example, the upper-level node (for example, the base station 100) provides a wireless backhaul service for the lower-level node (for example, the IAB node 110). It should be understood that an uplink and a downlink of the backhaul link may be separated, in other words, transmission on the uplink and transmission on the downlink are not initiated by a same node. Downlink transmission means that an upper-level node (for example, the base station 100) transmits information or data to a lower-level node (for example, the IAB node 110). Uplink transmission means that a lower-level node (for example, the IAB node 110) transmits information or data to an upper-level node (for example, the base station 100). The node is not limited to a base station, an IAB node, and a terminal device. For example, in a device-to-device (D2D) scenario, a terminal device may be used as a relay node to serve another terminal device. In some scenarios, the wireless backhaul link may also be an access link. For example, the wireless backhaul link 123 may also be considered as an access link for the node 110, and the backhaul link 113 is also an access link for the node 100. It should be understood that the upper-level node may be a base station or may be a relay node, and the lower-level node may be a relay node or a terminal device having the relay function. For example, in the D2D scenario, the lower-level node may also be a terminal device.

In an implementation, an IAB node may include a mobile terminal (MT) and a distributed unit (DU). The MT is used by the IAB node to implement communication with an upper-level node, and the DU is used to implement communication between the IAB node and a lower-level node. A link on which the MT communicates with the upper-level node may be referred to as an upper-level backhaul link, and a link on which the DU communicates with the lower-level node may be referred to as a lower-level backhaul link. In some cases, for example, a case in which the lower-level node of the DU is a terminal device, the lower-level backhaul link may also be referred to as an access link.

In an NR system, the IAB node is configured with an MT resource and a DU resource. Three resource types may be configured for MT resources, and are separately downlink (D), uplink (U), and flexible (F). A donor base station of the IAB node may configure a type of the MT resource for the IAB node using signaling. Four resource types may be configured for DU resources, and are separately uplink, downlink, flexible, and not available (NA). "Not available" may also be described as "disabled", "unavailable", or the like. Further, DU-uplink resources or DU-flexible resources may be further classified into a hard resource and a soft resource. The hard resource refers to a resource that is always available to the DU. Whether the soft resource is available to the DU depends on an indication of the upper-level node. It can be further learned that the MT resources of the IAB node have three resource types, and the DU resources have seven resource types. One resource type of the MT resources and one resource type of the DU resources may be combined to support time division multiplexing, space division multiplexing, or even full-duplex mode transmission.

A full-duplex mode means that a device may receive a signal sent by another device and send a signal to another device at a same moment. In other words, receiving and sending may be performed at the same time.

(3) Space-Division Multiplexing (SDM)

To improve spectrum efficiency, the 3rd Generation Partnership Project (3GPP) provides a space division multiplexing scenario. The space division multiplexing means that a same frequency band is repeatedly used in different spaces. In mobile communication, a basic technology of the space division multiplexing is to implement space division using an adaptive array antenna, to form different beams in different user directions.

Figure 2:
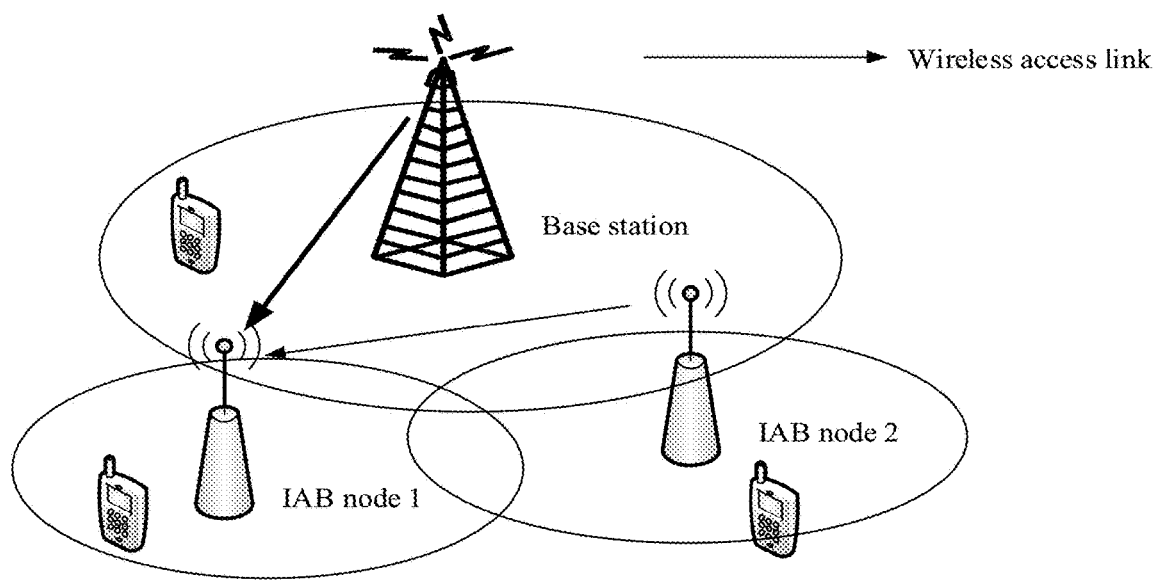
FIG. 2 is an example diagram of space division multiplexing in an IAB system.

In the space division multiplexing scenario, an IAB node may simultaneously receive a downlink signal sent by an upper-level node on a wireless backhaul link and an uplink signal sent by a lower-level node/terminal device on a wireless access link. Refer to an example diagram shown in FIG. 2. FIG. 2 may show a space division receiving scenario, and if a direction of an arrow in FIG. 2 is reversed, FIG. 2 shows a space division sending scenario. In the space division sending scenario, an IAB node 1 sends a signal to an upper-level node of the IAB node 1, that is, a base station. At the same time, the IAB node 1 sends a signal to a lower-level node of the IAB node 1, that is, an IAB node 2.

(4) Cross Link Interference (CLI)

When IAB nodes are densely deployed, mutual interference between the IAB nodes may deteriorate a signal to interference plus noise ratio (a ratio of a signal to interference and noise) of a wireless backhaul link, resulting in performance deterioration of the wireless backhaul link and affecting network performance and spectrum efficiency.

Figure 3:
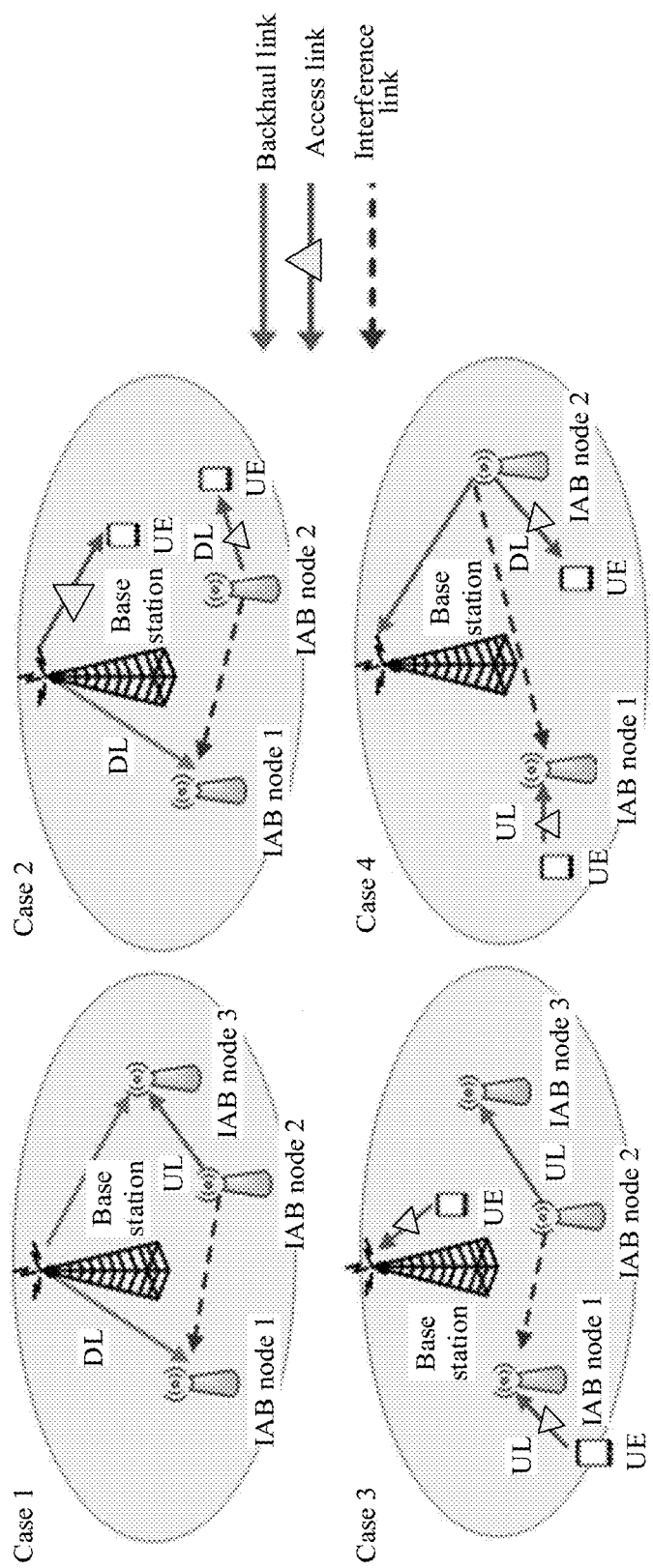
FIG. 3 is an example diagram of four types of inter-link interference.

For example, the following four possible types of inter-link interference exist between the IAB nodes. Refer to FIG. 3.

Case 1: A signal sent by an MT of an IAB node 2 to an upper-level node of the IAB node 2 may cause interference to signal receiving performed by an MT of an IAB node 1 from an IAB donor. In the case 1, the IAB donor may be an upper-level node of the IAB node 1 and an IAB node 3, and the IAB node 1 and the IAB node 3 may be upper-level nodes of the IAB node 2. The signal sent by the IAB node 2 to the upper-level node of the IAB node 2 through a backhaul link may cause interference to signal receiving performed by the IAB node 1 from the IAB donor. The case 1 may show interference in a space division multiplexing scenario. The IAB node 2 may be an interference source node, and the IAB node 1 may be an interfered node.

Case 2: A signal sent by a DU of an IAB node 2 to a lower-level node of the IAB node 2 may cause interference to signal receiving performed by an MT of an IAB node 1 from an IAB donor. In the case 2, the IAB donor may be an upper-level node of the IAB node 1, and the IAB node 2 may be an upper-level node of the IAB node 1. The signal sent by the IAB node 2 to the lower-level node of the IAB node 2 through an access link may cause interference to signal receiving performed by the IAB node 1 from the IAB donor. The case 2 may show interference in a non-space division multiplexing scenario (for example, a time division multiplexing scenario or a frequency division multiplexing scenario). The IAB node 2 may be an interference source node, and the IAB node 1 may be an interfered node.

Case 3: A signal sent by an MT of an IAB node 2 to an upper-level node of the IAB node 2 may cause interference to signal receiving performed by a DU of an IAB node 1 from a lower-level node of the IAB node 1. In the case 3, the IAB node 1 and an IAB node 3 may be upper-level nodes of the IAB node 2. The signal sent by the IAB node 2 to the upper-level node of the IAB node 2 through a backhaul link may cause interference to signal receiving performed by the IAB node 1 from the lower-level node of the IAB node 1, for example, cause interference to signal receiving performed by the IAB node 1 from a terminal device. The case 3 may show interference in a non-space division multiplexing scenario. The IAB node 2 may be an interference source node, and the IAB node 1 may be an interfered node.

Case 4: A signal sent by a DU of an IAB node 2 to a lower-level node of the IAB node 2 may cause interference to signal receiving performed by a DU of an IAB node 1 from a lower-level node of the IAB node 1. In the case 4, an IAB donor may be an upper-level node of the IAB node 2, and the IAB node 2 may be an upper-level node of the IAB node 1. The signal sent by the IAB node 2 to the lower-level node of the IAB node 2 through an access link may cause interference to signal receiving performed by the IAB node 1 from the lower-level node of the IAB node 1, for example, cause interference to signal receiving performed by the IAB node 1 from a terminal device. The case 4 may show interference in a space division multiplexing scenario. The IAB node 2 may be an interference source node, and the IAB node 1 may be an interfered node.

In the foregoing four cases, that the IAB node 2 may be an interference source node, and the IAB node 1 may be an interfered node may alternatively be described as that the IAB node 2 is an interference node of the IAB node 1. That a node 1 is an interference node of a node 2 indicates that a signal sent by the node 1 causes interference to the node 2, for example, causes interference to signal receiving performed by the node 2.

In the foregoing four cases, from a perspective of multiplexing scenarios, the case 1 and the case 4 show interference in the space division multiplexing scenario, and the case 2 and the case 3 show interference in the non-space division multiplexing scenario. From a perspective of transmission links, in the case 1 and the case 2, the IAB node 2 interferes with signal receiving on a backhaul link of the IAB node 1, and performance of the backhaul link of the IAB node 1 may be deteriorated; in the case 3 and the case 4, the IAB node interferes with signal receiving on an access link of the IAB node 1, and performance of the access link of the IAB node 1 may be deteriorated.

The foregoing four cases are used as examples, and do not constitute a limitation on this disclosure. During actual application, another case may exist for inter-link interference between the IAB nodes. It can be learned that the mutual interference between the IAB nodes may affect transmission link performance, and therefore affect the network performance and the spectrum efficiency.

In view of this, this disclosure provides a resource indication method and a communication apparatus, to reduce mutual interference between IAB nodes, and therefore improve network performance and spectrum efficiency.

The following describes the technical solutions with reference to the accompanying drawings. Unless otherwise specified, "/" represents an "or" relationship between associated objects. For example, A/B may represent A or B. In addition, unless otherwise specified, "a plurality of" means two or more than two. "One or more of the following items (pieces)" or a similar expression thereof refers to any combination of these items, including any combination of singular items (pieces) or plural items (pieces). For example, one or more of a, b, or c may represent a, b, c, a and b, a and c, b and c, or a and b and c, where a, b, and c may be singular or plural. In addition, to clearly describe the technical solutions, terms such as "first" and "second" are used to distinguish between technical features that have basically same or similar functions. A person skilled in the art may understand that the terms such as "first" and "second" do not limit a quantity and an execution sequence, and the terms such as "first" and "second" do not indicate a definite difference either.

Technologies described may be applied to various communication systems, for example, a 4th generation (4G) communication system, a 4.5G communication system, a 5th generation (5G) communication system, a system integrating a plurality of communication systems, and a future evolved communication system. The communication systems include, for example, a Long-Term Evolution (LTE) system, a new radio (NR) system, a Wi-Fi system, a communication system related to 3GPP, and another communication system of this type.

A terminal device (which may also be referred to as a terminal) may be a device having a wireless transceiver function; and may be deployed on land, where the deployment includes indoor or outdoor, or handheld or vehicle-mounted deployment, may be deployed on water (for example, on a ship), or may be deployed in air (for example, on an aerocraft, a balloon, and a satellite). The terminal device may be a user equipment (UE). The UE includes a handheld device, a vehicle-mounted device, a wearable device, or a computing device that has a wireless communication function. For example, the UE may be a mobile phone, a tablet computer, or a computer having the wireless transceiver function. The terminal device may alternatively be a virtual reality (VR) terminal device, an augmented reality (AR) terminal device, a smart vehicle terminal device, a wireless terminal in industrial control, a wireless terminal in self driving, a wireless terminal in telemedicine, a wireless terminal in a smart grid, a wireless terminal in a smart city, a wireless terminal in a smart home, or the like.

By way of example, and not limitation, the terminal device may be a wearable device. The wearable device may also be referred to as a wearable intelligent device, and is a general term of a wearable device that is intelligently designed and developed for daily wear using a wearable technology, for example, glasses, gloves, a watch, clothing, and shoes. The wearable device is a portable device that is directly worn on a body or integrated into clothes or an accessory of a user. The wearable device is not only a hardware device, but is used to implement a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

The terminal device may be a terminal in an Internet of things (IoT) system. IoT is an important component in development of future information technologies. A main technical feature of the IoT is to connect an object to a network using a communication technology, to implement an intelligent network of human-machine interconnection and thing-thing interconnection. The terminal may be a terminal in machine type communication (MTC). The terminal may be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement a method. Therefore, this disclosure may be applied to the internet of vehicles, for example, vehicle-to-everything (V2X), LTE-vehicle (LTE-V), and vehicle-to-vehicle (V2V).

A base station (BS) may be a device that is deployed in a radio access network and that can perform wireless communication with a terminal device. The base station may be in a plurality of forms, such as a macro base station, a micro base station, a relay station, and an access point. For example, the base station may be a base station in 5G or a base station in LTE. The base station in 5G may also be referred to as a transmission reception point (TRP) or a next generation NodeB (gNB). The base station in 5G may include a distributed unit (DU) and a centralized unit (CU).

Figure 4:
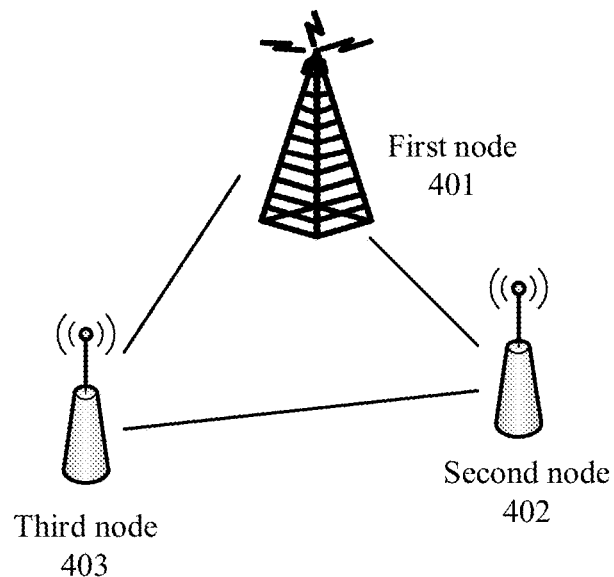
FIG. 4 is a schematic diagram of a network architecture.

FIG. 4 is a schematic diagram of a network architecture. The network architecture includes a first node 401, a second node 402, and a third node 403. It should be noted that quantities and forms of the nodes shown in FIG. 4 are merely used as an example, and do not constitute a limitation. For example, there may be one or more second nodes 402, and there may be one or more third nodes 403.

The first node 401 may be an upper-level node of the second node 402. The second node 402 may be an interference node of the third node 403. In other words, a signal sent by the second node 402 may cause interference to the third node 403, the second node 402 may be an interference source node, and the third node 403 may be an interfered node. The first node 401 may be a network device, that is, a base station. The second node 402 and the third node 403 may be IAB nodes, or may be terminal devices in some cases. An example in which the second node 402 and the third node 403 are IAB nodes is used for description.

The first node 401 may implement interference management in two manners, to be more specific, reduce interference caused by the second node 402 to the third node 403.

In an implementation, the first node 401 sends first indication information to the second node 402, where the first indication information includes first resource information, the first resource information is associated with a first reference signal, and the first resource information is for limiting sending of a to-be-sent signal by the second node 402 on a first resource indicated by the first resource information. The to-be-sent signal and the first reference signal may have a QCL relationship, such that the sending of the to-be-sent signal by the second node 402 on the first resource can be limited. The limiting sending of a to-be-sent signal by the second node 402 on a first resource may be: disallowing the second node 402 to send the to-be-sent signal on the first resource, or limiting transmit power for sending the to-be-sent signal by the second node 402 based on the first resource.

The limiting sending of a to-be-sent signal by the second node 402 may be performed based on two granularities. In one manner, the limiting sending of a to-be-sent signal by the second node 402 is performed based on a beam granularity, to be more specific, sending of the to-be-sent signal by the second node 402 using a beam corresponding to the first reference signal is limited. The beam corresponding to the first reference signal may be understood as a beam used for transmitting the first reference signal, a beam for transmitting the first reference signal, a beam carrying the first reference signal, a beam having a QCL relationship with the first reference signal, or the like. In the other manner, the limiting sending of a to-be-sent signal by the second node 402 is performed based on a link granularity, to be more specific, sending of the to-be-sent signal by the second node 402 through a transmission link corresponding to the first reference signal is limited, or sending of the to-be-sent signal by the second node 402 to a device corresponding to a second reference signal is limited. The transmission link corresponding to the first reference signal may be understood as a link for transmitting the first reference signal, and may be a wireless backhaul link or a wireless access link. The device corresponding to the second reference signal may be understood as a device that may receive the second reference signal, and may be an IAB node or a terminal device.

In the other implementation, the first node 401 sends third indication information to the third node 403, where the third indication information includes second resource information, the second resource information is associated with a third reference signal, and the second resource information is for limiting receiving of a signal by the third node 403 on a second resource indicated by the second resource information. The signal and the third reference signal may have a QCL relationship, such that the receiving of the signal by the third node 403 on the second resource can be limited. The limiting receiving of a signal by the third node 403 on a second resource may be: disallowing the third node 403 to receive the signal on the second resource.

The limiting receiving of a signal by the third node 403 may also be performed based on two granularities, and the two granularities are similar to the granularities based on which the sending of the to-be-sent signal by the second node 402 is limited. In one manner, the limiting receiving of a signal by the third node 403 is performed based on a beam granularity, to be more specific, receiving of the signal by the third node 403 using a beam corresponding to the third reference signal is limited. In the other manner, the limiting receiving of a signal by the third node 403 is performed based on a link granularity, to be more specific, receiving of the signal by the third node 403 through a transmission link corresponding to the third reference signal is limited, or receiving of the signal by the third node 403 from a device corresponding to the third reference signal is limited.

The foregoing two types of resource configuration information may be used to configure resources in a space domain dimension, to implement interference management in the space domain dimension. In addition, the two types of resource configuration information may be used to configure resources in a time domain dimension, to implement interference management in the space domain dimension and the time domain dimension; or the two types of resource configuration information may be used to configure resources in a frequency domain dimension, to implement interference management in the space domain dimension and the frequency domain dimension; or the two types of resource configuration information may be used to configure resources in a time domain dimension and a frequency domain dimension, to implement interference management in the space domain dimension, the time domain dimension, and the frequency domain dimension.

The network architecture and the service scenario are intended to describe the technical solutions more clearly, and do not constitute a limitation on the technical solutions provided. A person of ordinary skill in the art may know that: With evolution of the network architecture and emergence of new service scenarios, the technical solutions provided are also applicable to similar technical problems.

The following describes the resource indication method provided with reference to the accompanying drawings. The resource indication method is applied to a communication system including a first node, at least one second node, and a third node. The first node is an upper-level node of the at least one second node, and the at least one second node is an interference node of the third node. The communication system is not limited to an IAB system. The IAB system is used as an example for description. It should be noted that, in a description process, one second node and one third node are used as an example, and a name of information or data exchanged between the nodes is used as an example. These do not constitute a limitation.

Figure 5:
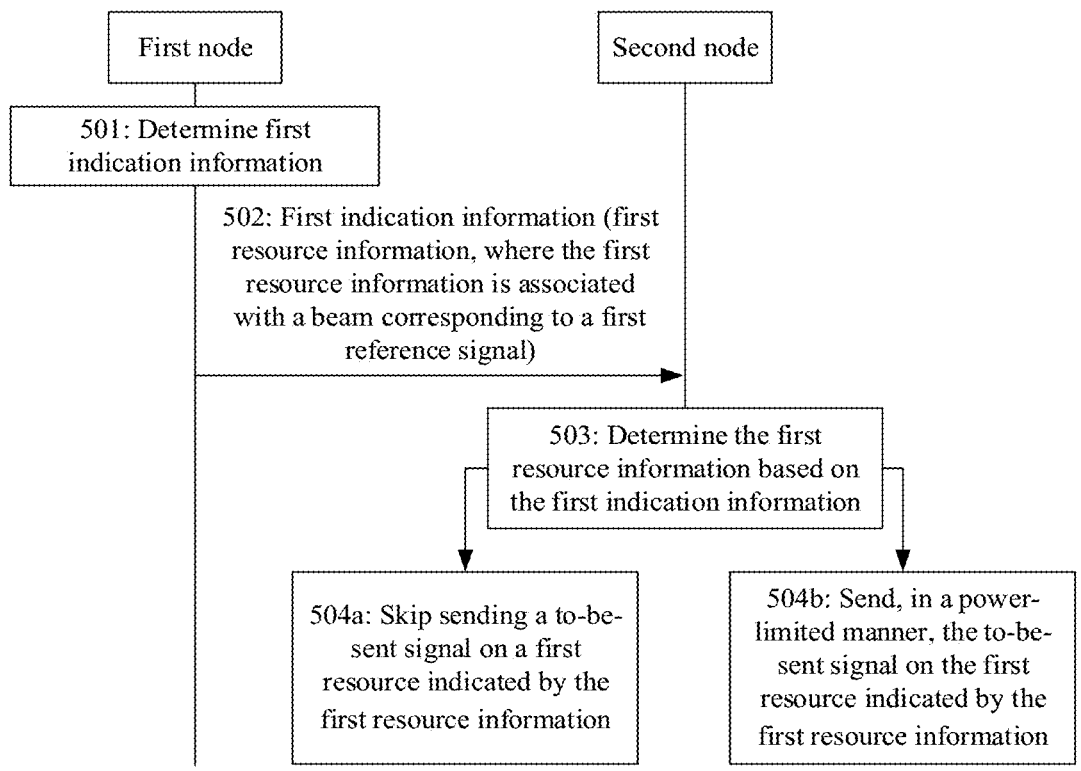
FIG. 5 is a schematic flowchart of a resource indication method.

FIG. 5 is a schematic flowchart of a resource indication method. A procedure may include but is not limited to the following steps.

Step 501: A first node determines first indication information.

The first node may be an IAB donor in an IAB system, or described as a base station.

Figure 6:
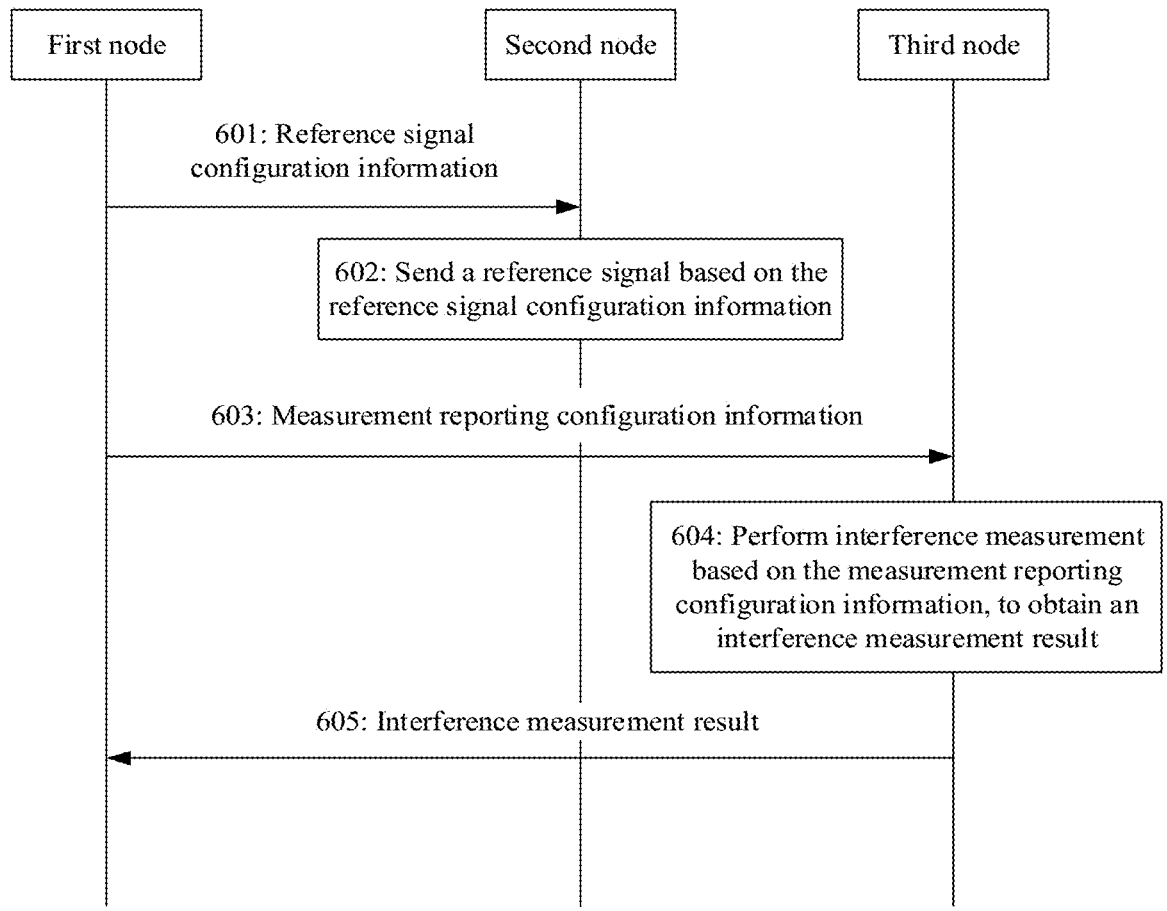
FIG. 6 is a schematic flowchart of measurement reporting.

In an implementation, before determining the first indication information, the first node may perform a measurement reporting procedure shown in FIG. 6. The measurement reporting procedure shown in FIG. 6 may include but is not limited to the following steps.

Step 601: The first node sends reference signal configuration information to a second node. Correspondingly, the second node receives the reference signal configuration information from the first node.

The first node sends the reference signal configuration information to a potential interference source node, for example, the second node. The first node may send the reference signal configuration information to the second node using F1 interface application protocol (F1-AP) signaling. Alternatively, this is described as that the first node sends reference signal configuration signaling to the second node, where the reference signal configuration signaling may be F-AP signaling, and is for configuring a reference signal. The first node may alternatively send the reference signal configuration information to the second node using radio resource control (RRC) signaling. For example, the IAB donor sends the reference signal configuration information to an MT of an IAB node using RRC signaling, where the reference signal configuration information may be for configuring the MT of the IAB node to send a sounding reference signal (SRS), and the SRS may be used as a reference signal for measurement of another node.

The reference signal configuration information may include a time-frequency resource of the reference signal, and indicate the time-frequency resource on which the second node sends the reference signal. The reference signal may be a channel state information (CSI) reference signal (CSI-RS), a synchronization signal (SS)/physical broadcast channel (PBCH) block, or another reference signal, for example, a sounding reference signal (SRS). The synchronization signal/physical broadcast channel block may be referred to as a synchronization signal block (SSB) for short. For ease of description, the synchronization signal block (SSB) is used for description. The synchronization signal block may include a primary synchronization signal (PSS), a secondary synchronization signal (SSS), and a physical broadcast channel (PBCH).

Step 602: The second node sends the reference signal based on the reference signal configuration information.

When receiving the reference signal configuration information, the second node sends the reference signal based on the reference signal configuration information. The reference signal configuration information includes the time-frequency resource of the reference signal, and the second node may send the reference signal on the time-frequency resource.

An object to which the second node sends the reference signal is not limited. The second node may send the reference signal to a third node, or may send the reference signal to another node. However, the reference signal sent by the second node may cause interference to the third node.

Step 603: The first node sends measurement reporting configuration information to the third node. Correspondingly, the third node receives the measurement reporting configuration information from the first node.

The measurement reporting configuration information may include measurement configuration information and measurement result reporting configuration information.

The measurement configuration information may include: a type of a to-be-measured reference signal, a time domain resource (for example, a periodicity and a subframe/slot/symbol-level offset) of the to-be-measured reference signal, a frequency resource (for example, a frequency and bandwidth) of the to-be-measured reference signal, and an identifier (for example, a physical cell identifier (PCI) or another ID that may indicate a node identifier) of a sending source node of the to-be-measured reference signal. A purpose of measurement is, for example, interference management or mobility management.

The first node sends the measurement reporting configuration information to a potential interfered node, for example, the third node. The measurement reporting configuration information indicates the third node to perform interference measurement and feed back an interference measurement result. The first node may send the measurement reporting configuration information to the third node using F1-AP signaling or RRC signaling.

Step 604: The third node performs interference measurement based on the measurement reporting configuration information, to obtain the interference measurement result When receiving the measurement configuration information, the third node performs interference measurement based on the measurement configuration information, to obtain the interference measurement result, and may perform interference measurement reporting based on interference measurement reporting configuration information. The interference measurement result may include one or more of a channel quality indicator (CQI), reference signal received power (RSRP), a precoding matrix indicator (PMI), a rank indication (RI), a CSI-reference signal resource indicator (CRI), a signal to interference plus noise ratio (SINR), an interference to noise ratio (INR), reference signal received quality (RSRQ), and a reference signal strength indicator (RSSI).

Step 605: The third node sends the interference measurement result to the first node. Correspondingly, the first node receives the interference measurement result from the third node.

The third node may send the interference measurement result to the first node using F1-AP signaling or RRC signaling.

The measurement reporting procedure is briefly described in step 601 to step 605. For a process of the measurement reporting procedure, refer to descriptions in a related protocol or standard.

The first node may determine the first indication information based on the interference measurement result reported by the third node. The first indication information may also be described as resource configuration information, configuration indication information, interference configuration indication information, or the like. The first indication information indicates first resource information, and the first resource information is associated with a first reference signal.

The first reference signal may be the reference signal that is sent by the second node and that causes interference to the third node in step 602. The first node may learn of, based on the interference measurement result reported by the third node, a specific reference signal or specific reference signals that are sent by the second node and that cause interference to the third node. There may be one or more first reference signals. One first reference signal is used as an example for description.

In the embodiment shown in FIG. 5, that the first resource information is associated with a first reference signal includes: The first resource information is associated with a beam corresponding to the first reference signal. The beam corresponding to the first reference signal may be understood as a beam used for transmitting the first reference signal, a beam for transmitting the first reference signal, a beam carrying the first reference signal, a beam having a QCL relationship with the first reference signal, or the like.

In an implementation, the first resource information may include second indication information, the second indication information indicates that a to-be-sent signal of the second node and the first reference signal have a QCL relationship, such that the second node determines a resource for limiting sending of the to-be-sent signal. For the QCL relationship, refer to the foregoing detailed descriptions of the QCL relationship.

The first resource information may further include one or more of the following: a cell identifier, a reference signal identifier, a port identifier, a panel identifier, first time domain resource information, or first frequency domain resource information.

The cell identifier is for identifying a cell to which the first reference signal belongs. For an IAB node, a DU of the IAB node may simultaneously support working of a plurality of cells. The cell identifier may be a PCI, or another cell identifier indicated by configuring a physical cell and a mapping relationship. The reference signal identifier is for identifying a specific reference signal. For example, the reference signal is an SSB, and the reference signal identifier may be an SSB index that is for identifying a different SSB in a same SSB periodicity. The cell identifier and the reference signal identifier are for identifying the first reference signal. For example, if the cell identifier is a cell 1, and the reference signal identifier is an SSB-2, the first reference signal is the SSB-2 in the cell 1.

Further, when the first reference signal is learned of, the beam corresponding to the first reference signal may be learned of. For example, the reference signal is an SSB. Generally, different SSBs sent by a network correspond to different beam directions. It may be understood that different SSBs correspond to different beams. In this case, when an SSB index is learned of, a beam corresponding to the SSB index may be learned of.

The port identifier is for identifying a port for sending the first reference signal. The DU of the IAB node has a plurality of ports. One port may correspond to one antenna subarray, and different ports may correspond to different antenna subarrays.

The panel identifier is for identifying a panel for sending the first reference signal. One panel may correspond to one or more antenna subarrays, and different panels may correspond to different antenna subarrays.

The port identifier and/or the panel identifier may be for identifying a direction of the beam corresponding to the first reference signal. In the embodiment shown in FIG. 5, the port identifier and/or the panel identifier may be used as first space domain resource information. Alternatively, this is described as that the first space domain resource information includes one or more of the following: the port identifier and the panel identifier.

The first time domain resource information may include a periodicity and an offset in the periodicity. The periodicity may be measured in slots, milliseconds, frames, or the like. For example, the periodicity may be N slots, X milliseconds, or Y frames. The offset in the periodicity may be measured in subframes, slots, symbols, or the like.

The first frequency domain resource information may include one or more of the following: a frequency value, an ID of a bandwidth part (BWP), physical resource block (PRB) information, and an index of a serving carrier. The bandwidth part is bandwidth formed by a segment of contiguous frequency domain resources in a cell/on a carrier. The first frequency domain resource information may be explicitly indicated in the foregoing listed manners, or may be implicitly indicated. For example, if there is a correspondence between a cell and available bandwidth, available bandwidth corresponding to the cell identifier may be learned of when the cell identifier is learned of, to determine the first frequency domain resource information.

In an implementation, the first resource information includes the first space domain resource information and the first time domain resource information, such that the second node limits, based on the first space domain resource information, the sending of the to-be-sent signal on a first time domain resource indicated by the first time domain resource information.

In an implementation, the first resource information includes the first space domain resource information and the first frequency domain resource information, such that the second node limits, based on the first space domain resource information, the sending of the to-be-sent signal on a first frequency domain resource indicated by the first frequency domain resource information.

In an implementation, the first resource information includes the first space domain resource information, the first time domain resource information, and the first frequency domain resource information, such that the second node limits, based on the first space domain resource information, the sending of the to-be-sent signal on a first time domain resource indicated by the first time domain resource information and a first frequency domain resource indicated by the first frequency domain resource information.

Optionally, the first indication information may be for configuring an NA resource of a DU of the second node, in other words, the first resource information may be NA resource information configured for the DU of the second node. The first indication information is further for configuring the NA resource information to be associated with the first reference signal. That the NA resource information is associated with the first reference signal may be understood as that the NA resource information is associated with the beam for transmitting the first reference signal. The NA resource information may be for limiting the sending of the to-be-sent signal by the second node on the NA resource, where there is the QCL relationship between the to-be-sent signal and the first reference signal.

The NA resource may include a time domain resource and a frequency domain resource. Cells on the DU of the second node may correspond to different frequency domain resources. In this case, the first node may indicate the frequency domain resource in the NA resource using one or more cells on the DU of the second node. All cells on the DU of the second node may correspond to a same frequency domain resource. In this case, the first node may directly indicate the frequency domain resource in the NA resource.

Step 502: The first node sends the first indication information to the second node. Correspondingly, the second node receives the first indication information from the first node.

The first node may send the first indication information to the second node using F1-AP signaling, or may send the first indication information to the second node using F1 interface control plane (F1-control plane (F1-C)) signaling.

Step 503: The second node determines the first resource information based on the first indication information.

When receiving the first indication information, the second node determines the first resource information based on the first indication information. The first resource information is for limiting the sending of the to-be-sent signal by the second node on a first resource indicated by the first resource information.

In an implementation 1, the first resource information indicates that the second node is not allowed to send the to-be-sent signal on the first resource. For example, the first resource information indicates that the first resource is unavailable for the second node, or indicates the second node not to send the signal in a slot or on a symbol of the first resource.

In an implementation 2, the first resource information is for limiting, in a power-limited manner, the sending of the to-be-sent signal by the second node on the first resource. Power-limited manners may include: Manner A: Send the to-be-sent signal on the first resource at transmit power less than a threshold. A unit of the threshold may be dBm, and a specific value is not limited. Manner B: Send the to-be-sent signal on the first resource at transmit power less than transmit power for sending a second reference signal. Manner C: Send the to-be-sent signal on the first resource based on an offset threshold to transmit power for sending a second reference signal. The offset threshold may be notified by the first node to the second node. Alternatively, an offset threshold to transmit power of each reference signal is predefined.

The to-be-sent signal refers to a signal to be sent by the second node, and may be a demodulation reference signal (DMRS). The to-be-sent signal may be a signal obtained after modulation processing is performed on to-be-sent data, information, signaling, or the like. The to-be-sent signal and the first reference signal have the QCL relationship.

Step 504a: The second node does not send the to-be-sent signal on the first resource indicated by the first resource information. This step corresponds to the implementation 1.

Based on content included in the first resource information, the second node does not send the to-be-sent signal on the first resource.

In a first implementation, the first resource information includes the first space domain resource information, and the first space domain resource information indicates the port identifier and/or the panel identifier, such that the first resource includes a first space domain resource, and the first space domain resource includes the identified port and/or the identified panel. The second node does not send the to-be-sent signal using the identified port and/or the identified panel. It may be understood that the first space domain resource is unavailable for the second node to send the to-be-sent signal. For example, the identified panel is a panel 1, and the second node does not send the to-be-sent signal using the panel 1.

Further, one panel may support one or more beams for receiving and sending signals. The second node may not send the to-be-sent signal using all beams supported by the identified panel. For example, the identified panel is a panel 1, and the panel 1 supports four beams for receiving and sending signals. In this case, the second node may not send the to-be-sent signal using the four beams. The second node may not send the to-be-sent signal using one or more beams supported by the identified panel, for example, may not use the beam corresponding to the first reference signal in the beam supported by the identified panel. Similarly, one port may also support one or more beams for receiving and sending signals, and the second node may not send the to-be-sent signal using a beam supported by the identified port. This solution is similar to the solution in which the second node does not send the to-be-sent signal using the beam supported by the identified panel.

Figure 7A:
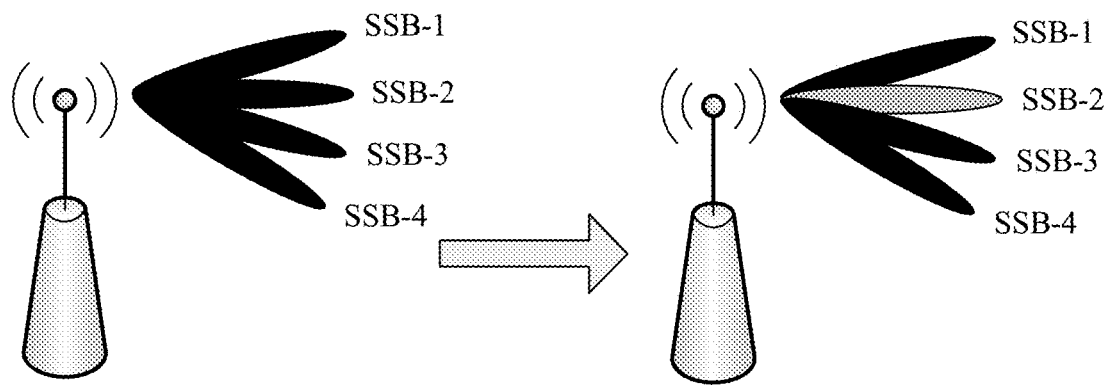
FIG. 7A is an example diagram of disallowing sending of a to-be-sent signal.

For example, refer to an example diagram of disallowing sending of the to-be-sent signal shown in FIG. 7A. Before receiving the first indication information, the second node separately sends an SSB-1, an SSB-2, an SSB-3, and an SSB-4 on four beams supported by a panel, where the beams corresponding to the four SSBs in the first figure in FIG. 7A are black. The SSB-2 is the first reference signal and causes interference to the third node. The first space domain resource information includes an identifier of the panel. When sending a to-be-sent signal that has a QCL relationship with the SSB-2, the second node may not send the to-be-sent signal using a beam corresponding to the SSB-2, where the beam corresponding to the SSB-2 in the second figure in FIG. 7A is gray. Alternatively, the second node may not send the to-be-sent signal using the four beams.

It may be understood that a granularity of a space domain resource indicated by the first space domain resource may be the same as a granularity of a space domain resource on which the to-be-sent signal is not allowed to be sent. For example, the granularities each are a panel. The granularity of the space domain resource indicated by the first space domain resource may be greater than the granularity of the space domain resource on which the to-be-sent signal is not allowed to be sent. For example, the granularity of the space domain resource indicated by the first space domain resource is a panel, and the granularity of the space domain resource on which the to-be-sent signal is not allowed to be sent is a beam.

The second node does not send the to-be-sent signal using the beam corresponding to the first reference signal, but may send the to-be-sent signal using a beam corresponding to another reference signal.

Currently, the first node performs interference management on the second node based on the interference measurement result reported by the third node. The interference management is usually avoidance of a time domain resource and/or a frequency domain resource. For example, a time domain resource and/or a frequency domain resource of the first reference signal are/is disabled, in other words, the time domain resource and/or the frequency domain resource of the first reference signal are/is unavailable regardless of an object to which the signal is sent. In this way, directly disabling the time domain resource and/or the frequency domain resource of the first reference signal causes a significant decrease in a network capacity. However, in this implementation, the first node indicates, using the first indication information, the second node not to use the beam corresponding to the first reference signal to send the to-be-sent signal that has the QCL relationship with the first reference signal, and a time-frequency resource of the first reference signal is not disabled. In addition, the beam corresponding to the first reference signal may be used to transmit another to-be-sent signal. Therefore, mutual interference between IAB nodes can be reduced, and the network capacity can be improved.

In a second implementation, the first resource information includes the first space domain resource information and the first time domain resource information, the first space domain resource information indicates the port identifier and/or the panel identifier, and the first time domain resource information indicates the first time domain resource. The second node does not send the to-be-sent signal on the first time domain resource using the identified port and/or the identified panel. Further, the second node does not send the to-be-sent signal on the first time domain resource using the beam corresponding to the first reference signal.

That the second node does not send the to-be-sent signal on the first time domain resource using the beam corresponding to the first reference signal may be understood as that the second node does not use the beam corresponding to the first reference signal to send the to-be-sent signal on the first time domain resource. In this way, an achieved effect is that the second node may send the to-be-sent signal on the first time domain resource using another beam, or may send the to-be-sent signal on another time domain resource using the beam corresponding to the first reference signal, such that mutual interference between IAB nodes can be reduced, and a network capacity can be improved.

Figure 7B:
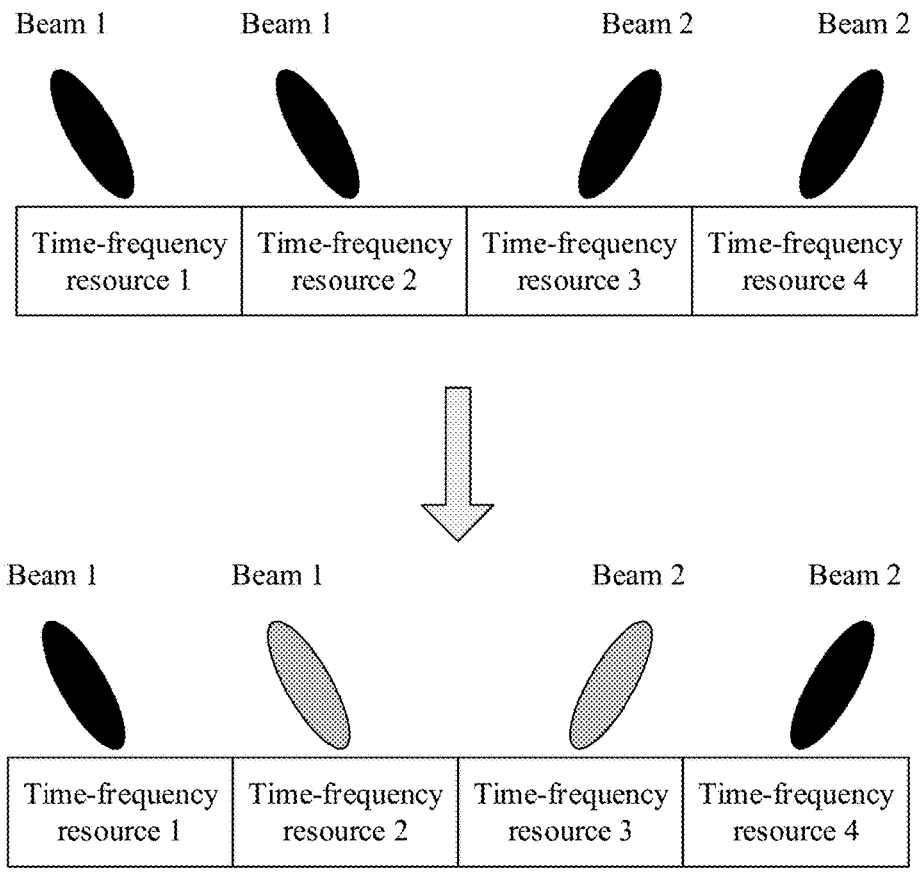
FIG. 7B is another example diagram of disallowing sending of a to-be-sent signal.

For example, refer to another example diagram of disallowing sending of the to-be-sent signal shown in FIG. 7B. Before receiving the first indication information, the second node sends a signal on a time domain resource 1 and a time domain resource 2 using a beam 1, and sends a signal on a time domain resource 3 and a time domain resource 4 using a beam 2. The first time domain resource information indicates the time domain resource 2 and the time domain resource 3, and beams corresponding to the first reference signal include the beam 1 and the beam 2. When sending the to-be-sent signal that has the QCL relationship with the first reference signal, the second node may not send the to-be-sent signal on the time domain resource 2 using the beam 1, and may not send the to-be-sent signal on the time domain resource 3 using the beam 2. Because the first time domain resource information does not indicate the time domain resource 1 and the time domain resource 4, the second node may send the to-be-sent signal on the time domain resource 1 using the beam 1, and may send the to-be-sent signal on the time domain resource 4 using the beam 2.

In a third implementation, the first resource information includes the first space domain resource information and the first frequency domain resource information, the first space domain resource information indicates the port identifier and/or the panel identifier, and the first frequency domain resource information indicates the first frequency domain resource. The second node does not send the to-be-sent signal on the first frequency domain resource using the identified port and/or the identified panel. Further, the second node does not send the to-be-sent signal on the first frequency domain resource using the beam corresponding to the first reference signal.

That the second node does not send the to-be-sent signal on the first frequency domain resource using the beam corresponding to the first reference signal may be understood as that the second node does not use the beam corresponding to the first reference signal to send the to-be-sent signal on the first frequency domain resource. In this way, an achieved effect is that the second node may send the to-be-sent signal on the first frequency domain resource using another beam, or may send the to-be-sent signal on another frequency domain resource using the beam corresponding to the first reference signal, such that mutual interference between IAB nodes can be reduced, and a network capacity can be improved.

In a fourth implementation, the first resource information includes the first space domain resource information, the first time domain resource information, and the first frequency domain resource information, the first space domain resource information indicates the port identifier and/or the panel identifier, the first time domain resource information indicates the first time domain resource, and the first frequency domain resource information indicates the first frequency domain resource. The second node does not send the to-be-sent signal on the first time domain resource and the first frequency domain resource using the identified port and/or the identified panel. Further, the second node does not send the to-be-sent signal on the first time domain resource and the first frequency domain resource using the beam corresponding to the first reference signal.

That the second node does not send the to-be-sent signal on the first time domain resource and the first frequency domain resource using the beam corresponding to the first reference signal may be understood as that the second node does not use the beam corresponding to the first reference signal to send the to-be-sent signal on the first time domain resource and the first frequency domain resource. In this way, an achieved effect is that the second node may send the to-be-sent signal on the first time domain resource and the first frequency domain resource using another beam, or may send the to-be-sent signal on another time-frequency resource using the beam corresponding to the first reference signal, such that mutual interference between IAB nodes can be reduced, and a network capacity can be improved.

When the first resource information includes the first space domain resource information, interference management in a space domain dimension may be implemented. When the first resource information includes the first space domain resource information, the first time domain resource information, and the first frequency domain resource information, interference management in a space domain dimension, a time domain dimension, and a frequency domain dimension may be implemented.

In a fifth implementation, the first resource information includes the first time domain resource information, and the first time domain resource information indicates the first time domain resource. The second node does not send the to-be-sent signal on the first time domain resource.

In a sixth implementation, the first resource information includes the first frequency domain resource information, and the first frequency domain resource information indicates the first frequency domain resource. The second node does not send the to-be-sent signal on the first frequency domain resource.

In a seventh implementation, the first resource information includes the first time domain resource information and the first frequency domain resource information, the first time domain resource information indicates the first time domain resource, and the first frequency domain resource information indicates the first frequency domain resource. The second node does not send the to-be-sent signal on the first time domain resource and the first frequency domain resource.

Step 504*b*: The second node sends, in the power-limited manner, the to-be-sent signal on the first resource indicated by the first resource information. This step corresponds to the implementation 2.

Manner A: The second node sends the to-be-sent signal on the first resource at transmit power less than the threshold. Based on the content included in the first resource information, there are the following several possible implementations.

In a first implementation, the first resource information includes the first space domain resource information, and transmit power for sending the to-be-sent signal by the second node using the beam corresponding to the first reference signal is less than the threshold.

Figure 8A:
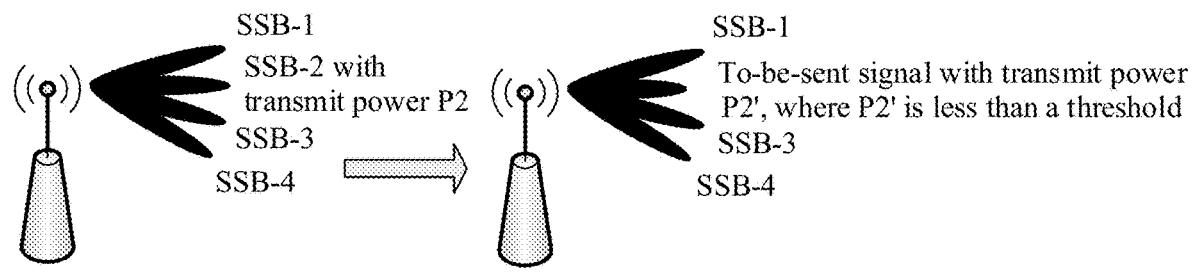
FIG. 8A is an example diagram of sending a to-be-sent signal in a power-limited manner.

For example, refer to an example diagram of sending the to-be-sent signal in a power-limited manner shown in FIG. 8A. Before the first indication information is received, transmit power for sending the first reference signal by the second node using a beam corresponding to an SSB-2 is P2. When sending the to-be-sent signal using the beam corresponding to the SSB-2, the second node may send the to-be-sent signal at transmit power that is less than the threshold. For example, the transmit power is P2', and P2' is less than the threshold.

In a second implementation, the first resource information includes the first space domain resource information and the first time domain resource information, and transmit power for sending the to-be-sent signal by the second node on the first time domain resource using the beam corresponding to the first reference signal is less than the threshold.

Figure 8B:
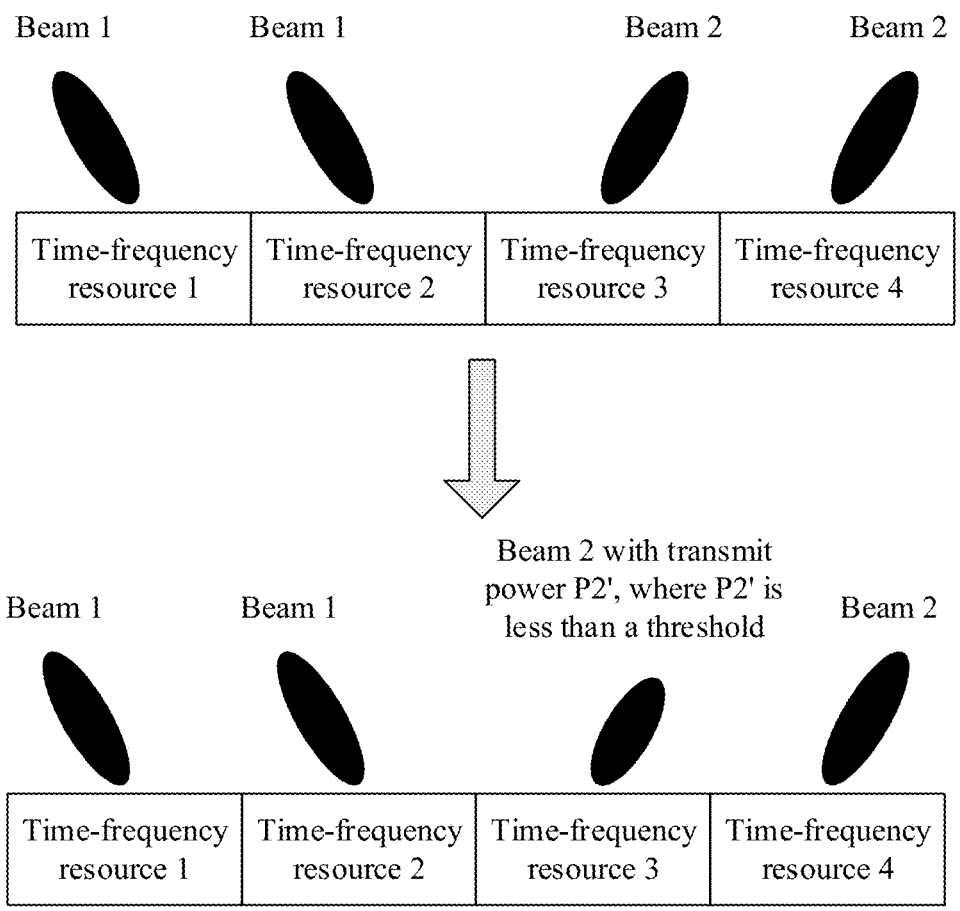
FIG. 8B is another example diagram of sending a to-be-sent signal in a power-limited manner.

For example, refer to another example diagram of sending the to-be-sent signal in a power-limited manner shown in FIG. 8B. The first time domain resource information indicates a time domain resource 3, and the beam corresponding to the first reference signal is a beam 2. The second node may send, on the time domain resource 3 using the beam 2, the to-be-sent signal at transmit power that is less than the threshold. For example, the transmit power is P2', and P2' is less than the threshold.

In a third implementation, the first resource information includes the first space domain resource information and the first frequency domain resource information, and transmit power for sending the to-be-sent signal by the second node on the first frequency domain resource using the beam corresponding to the first reference signal is less than the threshold.

In a fourth implementation, the first resource information includes the first space domain resource information, the first time domain resource information, and the first frequency domain resource information, and transmit power for sending the to-be-sent signal by the second node on the first time domain resource and the first frequency domain resource using the beam corresponding to the first reference signal is less than the threshold.

In a fifth implementation, the first resource information includes the first time domain resource information, and transmit power for sending the to-be-sent signal by the second node on the first time domain resource is less than the threshold.

In a sixth implementation, the first resource information includes the first frequency domain resource information, and transmit power for sending the to-be-sent signal by the second node on the first frequency domain resource is less than the threshold.

In a seventh implementation, the first resource information includes the first time domain resource information and the first frequency domain resource information, and transmit power for sending the to-be-sent signal by the second node on the first time domain resource and the first frequency domain resource is less than the threshold.

Manner B: The second node sends the to-be-sent signal on the first resource at transmit power less than the transmit power for sending the second reference signal. The first reference signal and the second reference signal may be different reference signals in a same reference signal periodicity. For example, the reference signal is an SSB, and the first reference signal and the second reference signal are different SSBs in a same SSB periodicity. The transmit power of the second reference signal may be notified by the first node to the second node. Alternatively, transmit power of each reference signal is predefined. Based on the content included in the first resource information, there are also seven possible implementations in the manner B, which are similar to the seven possible implementations in the manner A.

Manner C: The second node sends the to-be-sent signal on the first resource based on the offset threshold to the transmit power for sending the second reference signal. For descriptions of the second reference signal, refer to the descriptions of the second reference signal in the manner B. The offset threshold may be notified by the first node to the second node. Alternatively, an offset threshold to transmit power of each reference signal is predefined. That the second node sends the to-be-sent signal on the first resource based on the offset threshold to the transmit power for sending the second reference signal may be represented as: the transmit power for sending the to-be-sent signal by the second node on the first resource=the transmit power for sending the second reference signal+the offset threshold; or the transmit power for sending the to-be-sent signal by the second node on the first resource<the transmit power for sending the second reference signal+the offset threshold. The offset threshold may be a negative number, for example, −3 dB, such that the transmit power for sending the to-be-sent signal on the first resource is less than the transmit power for sending the second reference signal, or the transmit power for sending the to-be-sent signal on the first resource is less than the threshold. Alternatively, the offset threshold may be a positive number, for example, 3 dB, such that the transmit power for sending the to-be-sent signal on the first resource is less than the threshold, or the transmit power for sending the to-be-sent signal on the first resource is less than a sum of the transmit power for sending the second reference signal and the offset threshold. Based on the content included in the first resource information, there are also seven possible implementations in the manner C, which are similar to the seven possible implementations in the manner A.

In the embodiment shown in FIG. 5, the first node sends the first indication information to the second node, such that interference caused by the second node to the third node can be reduced, and therefore network performance and spectrum efficiency can be improved. The first resource information in the first indication information is associated with the beam corresponding to the first reference signal, such that interference management in the space domain dimension can be implemented.

Figure 9:
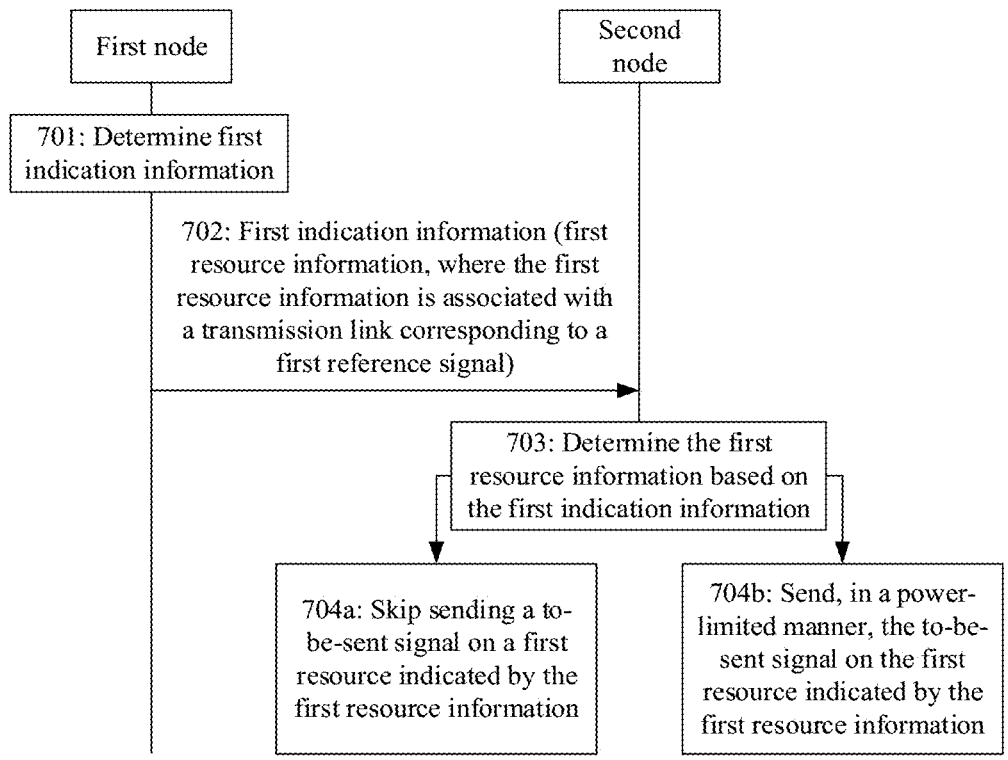
FIG. 9 is a schematic flowchart of another resource indication method.

FIG. 9 is a schematic flowchart of another resource indication method. A procedure of the method may include but is not limited to the following steps.

Step 701: A first node determines first indication information.

A difference between step 701 and step 501 lies in that content included in first resource information is different. For remaining content, refer to descriptions in step 501.

In step 501, the first resource information includes the second indication information, and further includes one or more of the following: the cell identifier, the reference signal identifier, the port identifier, the panel identifier, the first time domain resource information, and the first frequency domain resource information. That the first resource information is associated with the first reference signal includes: The first resource information is associated with the beam corresponding to the first reference signal.

In step 701, the first resource information includes second indication information, and further includes one or more of the following: a cell identifier, a transmission link identifier, a peer device identifier of a second node, first time domain resource information, or first frequency domain resource information. Optionally, the first resource information further includes a reference signal identifier, and the cell identifier and the reference signal identifier may be for identifying a first reference signal. That the first resource information is associated with the first reference signal includes: The first resource information is associated with a transmission link corresponding to the first reference signal, or the first resource information is associated with a device corresponding to the first reference signal.

The transmission link identifier is for identifying a link for transmitting the first reference signal. The link may be a wireless access link, a wireless backhaul link, a link that is on a wireless access link and that includes a node set, or a link that is on a wireless backhaul link and that includes a node set, depending on a specific case. One node set may include one or more nodes. An identifier may be configured for the node set, and configuration information may come from the first node. One or more reference signals may be transmitted on the transmission link identified by the transmission link identifier, and the transmitted reference signal includes the first reference signal.

The peer device identifier of the second node is for identifying a peer device of the second node, for example, may be a receive end of the first reference signal. The peer device may be one IAB node. In this case, the peer device identifier is a node identifier of the IAB node. The peer device may be a group of IAB nodes. In this case, the peer device identifier is a node group identifier of the group of IAB nodes. The peer device may be one terminal device. In this case, the peer device identifier is a device identifier of the terminal device. The peer device may be a group of terminal devices. In this case, the peer device identifier is a device group identifier of the group of terminal devices.

In the embodiment shown in FIG. 9, the peer device identifier of the second node and/or the transmission link identifier may be used as first space domain resource information. Alternatively, this is described as that the first space domain resource information includes one or more of the following: the peer device identifier of the second node, the transmission link identifier, and the like.

Step 702: The first node sends the first indication information to the second node. Correspondingly, the second node receives the first indication information from the first node.

Step 703: The second node determines the first resource information based on the first indication information.

For an implementation process of step 702 and step 703, refer to descriptions of step 502 and step 503. Details are not described herein again.

Step 704a: The second node does not send a to-be-sent signal on a first resource indicated by the first resource information.

Based on the content included in the first resource information, the second node does not send the to-be-sent signal on the first resource.

In a first implementation, the first resource information includes the first space domain resource information, and the first space domain resource information indicates the peer device identifier of the second node and/or the transmission link identifier, such that the second node does not send the to-be-sent signal to the peer device identified by the peer device identifier, and/or does not send the to-be-sent signal through the transmission link identified by the transmission link identifier.

In a second implementation, the first resource information includes the first space domain resource information and the first time domain resource information, the first space domain resource information indicates the peer device identifier of the second node and/or the transmission link identifier, and the first time domain resource information indicates a first time domain resource. On the first time domain resource, the second node does not send the to-be-sent signal to the peer device identified by the peer device identifier, and/or does not send the to-be-sent signal through the transmission link identified by the transmission link identifier. In other words, the second node does not send the to-be-sent signal to the peer device identified by the peer device identifier on the first time domain resource, and/or does not send the to-be-sent signal through the transmission link identified by the transmission link identifier on the first time domain resource.

In a third implementation, the first resource information includes the first space domain resource information and the first frequency domain resource information, the first space domain resource information indicates the peer device identifier of the second node and/or the transmission link identifier, and the first frequency domain resource information indicates a first frequency domain resource. On the first frequency domain resource, the second node does not send the to-be-sent signal to the peer device identified by the peer device identifier, and/or does not send the to-be-sent signal through the transmission link identified by the transmission link identifier. In other words, the second node does not send the to-be-sent signal to the peer device identified by the peer device identifier on the first frequency domain resource, and/or does not send the to-be-sent signal through the transmission link identified by the transmission link identifier on the first frequency domain resource.

In a fourth implementation, the first resource information includes the first space domain resource information, the first time domain resource information, and the first frequency domain resource information, the first space domain resource information indicates the peer device identifier of the second node and/or the transmission link identifier, the first time domain resource information indicates a first time domain resource, and the first frequency domain resource information indicates a first frequency domain resource. On the first time domain resource and the first frequency domain resource, the second node does not send the to-be-sent signal to the peer device identified by the peer device identifier, and/or does not send the to-be-sent signal through the transmission link identified by the transmission link identifier. In other words, the second node does not send the to-be-sent signal to the peer device identified by the peer device identifier on the first time domain resource and the first frequency domain resource, and/or does not send the to-be-sent signal through the transmission link identified by the transmission link identifier on the first time domain resource and the first frequency domain resource.

In a fifth implementation, the first resource information includes the first time domain resource information, and the first time domain resource information indicates a first time domain resource. The second node does not send the to-be-sent signal on the first time domain resource.

In a sixth implementation, the first resource information includes the first frequency domain resource information, and the first frequency domain resource information indicates a first frequency domain resource. The second node does not send the to-be-sent signal on the first frequency domain resource.

In a seventh implementation, the first resource information includes the first time domain resource information and the first frequency domain resource information, the first time domain resource information indicates a first time domain resource, and the first frequency domain resource information indicates a first frequency domain resource. The second node does not send the to-be-sent signal on the first time domain resource and the first frequency domain resource.

Step 704b: The second node sends, in a power-limited manner, the to-be-sent signal on the first resource indicated by the first resource information.

Manner A: The second node sends the to-be-sent signal on the first resource at transmit power less than a threshold. Based on the content included in the first resource information, there are the following several possible implementations.

In a first implementation, the first resource information includes the first space domain resource information, and transmit power for sending the to-be-sent signal by the second node to the identified peer device is less than the threshold, and/or transmit power for sending the to-be-sent signal through the identified transmission link is less than the threshold.

In a second implementation, the first resource information includes the first space domain resource information and the first time domain resource information, and transmit power for sending the to-be-sent signal by the second node to the identified peer device on the first time domain resource is less than the threshold, and/or transmit power for sending the to-be-sent signal through the identified transmission link on the first time domain resource is less than the threshold.

In a third implementation, the first resource information includes the first space domain resource information and the first frequency domain resource information, and transmit power for sending the to-be-sent signal by the second node to the identified peer device on the first frequency domain resource is less than the threshold, and/or transmit power for sending the to-be-sent signal through the identified transmission link on the first frequency domain resource is less than the threshold.

In a fourth implementation, the first resource information includes the first space domain resource information, the first time domain resource information, and the first frequency domain resource information, and transmit power for sending the to-be-sent signal by the second node to the identified peer device on the first time domain resource and the first frequency domain resource is less than the threshold, and/or transmit power for sending the to-be-sent signal through the identified transmission link on the first time domain resource and the first frequency domain resource is less than the threshold.

In a fifth implementation, the first resource information includes the first time domain resource information, and transmit power for sending the to-be-sent signal by the second node on the first time domain resource is less than the threshold.

In a sixth implementation, the first resource information includes the first frequency domain resource information, and transmit power for sending the to-be-sent signal by the second node on the first frequency domain resource is less than the threshold.

In a seventh implementation, the first resource information includes the first time domain resource information and the first frequency domain resource information, and transmit power for sending the to-be-sent signal by the second node on the first time domain resource and the first frequency domain resource is less than the threshold.

Manner B: The second node sends the to-be-sent signal on the first resource at transmit power less than transmit power for sending a second reference signal. Based on the content included in the first resource information, there are also seven possible implementations in the manner B, which are similar to the seven possible implementations in the manner A.

Manner C: The second node sends the to-be-sent signal on the first resource based on an offset threshold to transmit power for sending a second reference signal. Based on the content included in the first resource information, there are also seven possible implementations in the manner C, which are similar to the seven possible implementations in the manner A.

For a part in step 704*b* that is the same as that in step 504*b*, for example, the second reference signal or the threshold, refer to corresponding descriptions of step 504*b*.

In the embodiment shown in FIG. 9, the first node sends the first indication information to the second node, such that interference caused by the second node to a third node can be reduced, and therefore network performance and spectrum efficiency can be improved. The first resource information in the first indication information is associated with the transmission link/device corresponding to the first reference signal, such that interference management in a space domain dimension can be implemented.

A difference between the embodiment shown in FIG. 5 and the embodiment shown in FIG. 9 lies in that a granularity of interference management in FIG. 5 is a beam, and a granularity of interference management in FIG. 9 is a transmission link or a device.

Optionally, in the embodiment shown in FIG. 9, the first resource information may be further for limiting sending of another to-be-sent signal. The other to-be-sent signal has a QCL relationship with another reference signal on the identified transmission link, or other to-be-sent information has a QCL relationship with another reference signal sent to the identified peer device. It may be understood that, the first indication information may be for configuring an unavailable resource for a signal that has a QCL relationship with a reference signal on the identified transmission link, or configuring an unavailable resource for information that has a QCL relationship with reference information sent to the identified peer device. The unavailable resource may also be described as a resource that cannot be used, or a resource that is used in the power-limited manner. Alternatively, this may be described as that the signal is not sent on the resource, or the signal is sent on the resource in the power-limited manner.

For node communication in a fixed direction, if a terminal device is also in the direction, an access link and a backhaul link use a consistent transmission link. Through configuration of an unavailable resource for a signal that has a QCL relationship with a reference signal on the identified transmission link, interference caused when an interference source node sends a signal to the terminal device in an interference direction can be avoided.

Figure 10:
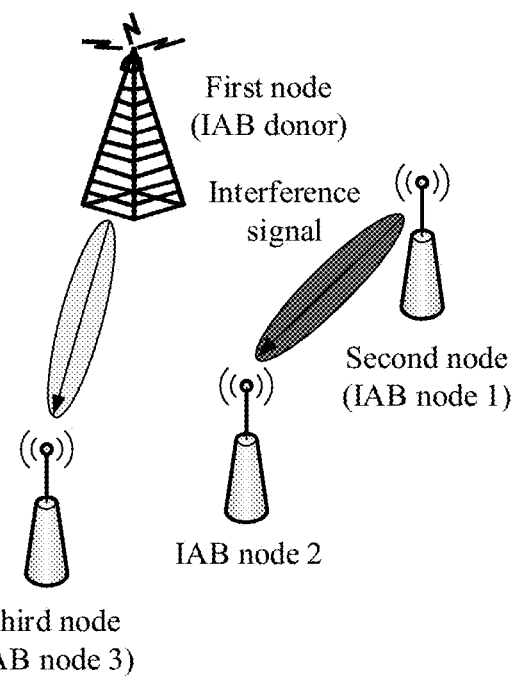
FIG. 10 is a schematic diagram of a scenario.

Refer to a schematic diagram of a scenario shown in FIG. 10. The schematic diagram of the scenario is applicable to the embodiments shown in FIG. 5 and FIG. 9. In FIG. 10, a first node is an IAB donor, a second node (an IAB node 1) is an interference source node, a third node (an IAB node 3) is an interfered node, and a signal sent by the second node to an IAB node 2 may cause interference to signal receiving performed by the third node from the first node.

For example, in the embodiment shown in FIG. 5, the first node sends the first indication information to the second node, such that when sending the to-be-sent signal that has the QCL relationship with the interference signal, the second node does not send the to-be-sent signal using the beam corresponding to the interference signal, or sends the to-be-sent signal in the power-limited manner using the beam corresponding to the interference signal.

For example, in the embodiment shown in FIG. 9, the first node sends the first indication information to the second node, such that when sending the to-be-sent signal that has the QCL relationship with the interference signal, the second node does not send the to-be-sent signal through the transmission link identified by the transmission link identifier, or sends the to-be-sent signal in the power-limited manner through the transmission link identified by the transmission link identifier.

It may be understood that, in the embodiments shown in FIG. 5 and FIG. 9, that the first node indicates, using the first indication information, the second node to avoid sending the to-be-sent signal that may cause interference to the second node is interference management for signal sending. The first node may also indicate, using third indication information, the third node to avoid receiving a signal that may cause interference to the third node, and this is interference management for signal receiving. In embodiments shown in FIG. 11 and FIG. 12, the interference management for signal receiving is described. For a part similar to that in FIG. 5 or FIG. 9, refer to corresponding descriptions in FIG. 5 or FIG. 9.

Figure 11:
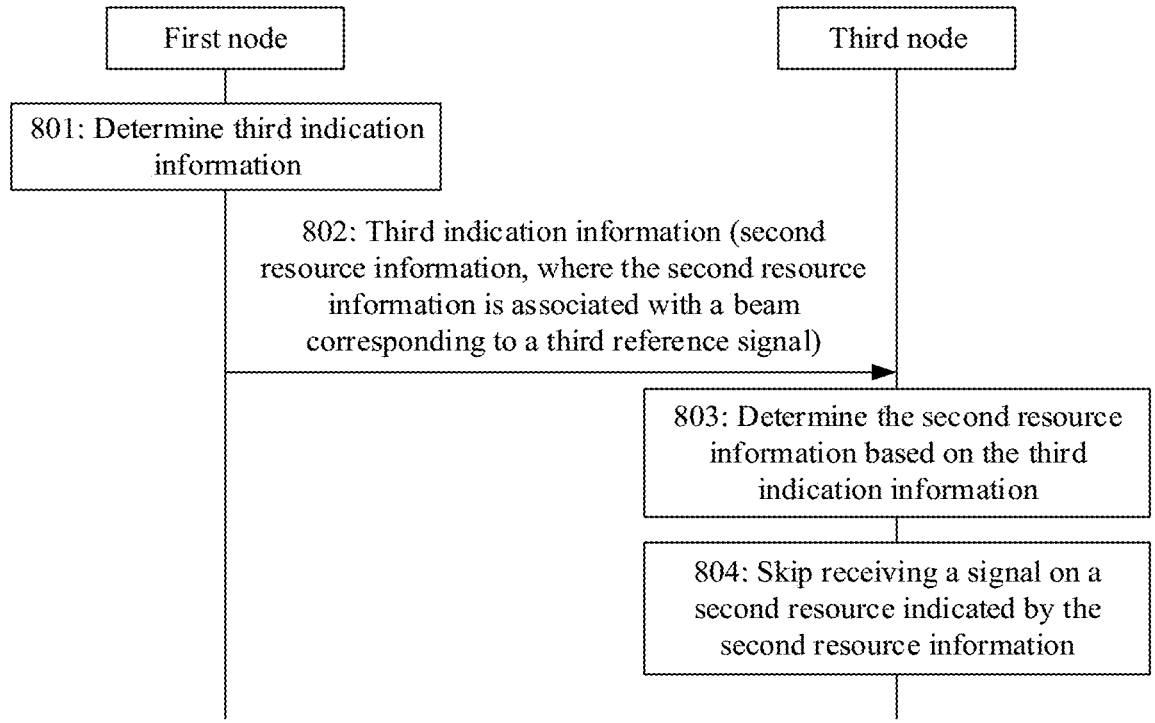
FIG. 11 is a schematic flowchart of another resource indication method.

FIG. 11 is a schematic flowchart of still another resource indication method. A procedure of the method may include but is not limited to the following steps.

Step 801: A first node determines third indication information.

The first node may determine the third indication information based on an interference measurement result reported by a third node. The third indication information may also be described as strong interference indication information, interference configuration indication information, or the like. The third indication information indicates the third node to avoid receiving a signal that may cause interference to the third node.

In an implementation, the third indication information indicates second resource information, and the second resource information is associated with a third reference signal. That the second resource information is associated with a third reference signal includes: The second resource information is associated with a beam corresponding to the third reference signal. In an implementation, the beam corresponding to the third reference signal is a beam used by an MT of the third node to receive the third reference signal, and the third reference signal is a reference signal sent by a second node, for example, a CSI-RS, an SS/PBCH block, an SRS, or a DMRS. In another implementation, the beam corresponding to the third reference signal is a beam used by a DU of the third node to receive the third reference signal, and the third reference signal is an uplink reference signal sent by the second node, for example, an SRS. The SRS may be sent by a lower-level node of the third node, for example, a terminal device. It may be understood that the beam corresponding to the third reference signal is a beam used by the third node to receive the third reference signal, that is, a receive beam corresponding to the third reference signal. In step 501, the first resource information is associated with a transmit beam corresponding to the first reference signal, and the transmit beam corresponding to the first reference signal may be understood as a beam used by the second node to send the first reference signal.

The second resource information includes fourth indication information, the fourth indication information indicates that the third reference signal and the signal have a QCL relationship, and the signal is a receiving signal. The indication information indicates that the receive beam corresponding to the third reference signal has a QCL relationship with a receive beam of the MT of the third node, or the receive beam corresponding to the third reference signal has a QCL relationship with a receive beam of the DU of the third node.

The second resource information may further include one or more of the following: a cell identifier, a reference signal identifier, a port identifier, a panel identifier, second time domain resource information, or second frequency domain resource information.

Optionally, the third indication information further includes a scheduling mode of the third reference signal, and the scheduling mode may be semi-static scheduling or passive scheduling. The scheduling mode indicates how scheduling is performed when the second node sends the third reference signal.

Step 802: The first node sends the third indication information to the third node. Correspondingly, the third node receives the third indication information from the first node.

Step 803: The third node determines the second resource information based on the third indication information.

The second resource information is for limiting receiving of the signal by the third node on a second resource indicated by the second resource information, and the signal and the third reference signal have the QCL relationship. In an implementation, the second resource information indicates that the third node is not allowed to receive the signal on the second resource. For example, the second resource information indicates that the second resource is unavailable for the third node, or indicates the third node not to receive the signal in a slot or on a symbol of the second resource.

Step 804: The third node does not receive the signal on the second resource indicated by the second resource information.

In a first implementation, the second resource information includes second space domain resource information, and the second space domain resource information indicates the port identifier and/or the panel identifier, such that the third node does not receive the signal using an identified port and/or an identified panel. Further, the third node does not receive the signal using the receive beam corresponding to the third reference signal.

In a second implementation, the second resource information includes second space domain resource information and the second time domain resource information, the second space domain resource information indicates the port identifier and/or the panel identifier, and the second time domain resource information indicates a second time domain resource. The third node does not receive the signal on the second time domain resource using the receive beam corresponding to the third reference signal.

In a third implementation, the second resource information includes second space domain resource information and the second frequency domain resource information, the second space domain resource information indicates the port identifier and/or the panel identifier, and the second frequency domain resource information indicates a second frequency domain resource. The third node does not receive the signal on the second frequency domain resource using the receive beam corresponding to the third reference signal.

In a fourth implementation, the second resource information includes second space domain resource information, the second time domain resource information, and the second frequency domain resource information, the second space domain resource information indicates the port identifier and/or the panel identifier, the second time domain resource information indicates a second time domain resource, and the second frequency domain resource information indicates a second frequency domain resource. The third node does not receive the signal on the second time domain resource and the second frequency domain resource using the receive beam corresponding to the third reference signal.

In a fifth implementation, the second resource information includes the second time domain resource information, and the second time domain resource information indicates a second time domain resource. The second node does not receive the signal on the second time domain resource.

In a sixth implementation, the second resource information includes the second frequency domain resource information, and the second frequency domain resource information indicates a second frequency domain resource. The second node does not receive the signal on the second frequency domain resource.

In a seventh implementation, the second resource information includes the second time domain resource information and the second frequency domain resource information, the second time domain resource information indicates a second time domain resource, and the second frequency domain resource information indicates a second frequency domain resource. The second node does not receive the signal on the second time domain resource and the second frequency domain resource.

In the embodiment shown in FIG. 11, the first node sends the third indication information to the third node, to prevent the third node from receiving the interference signal, such that network performance and spectrum efficiency can be improved. The second resource information in the third indication information is associated with the beam corresponding to the third reference signal, such that interference management in a space domain dimension can be implemented.

Figure 12:
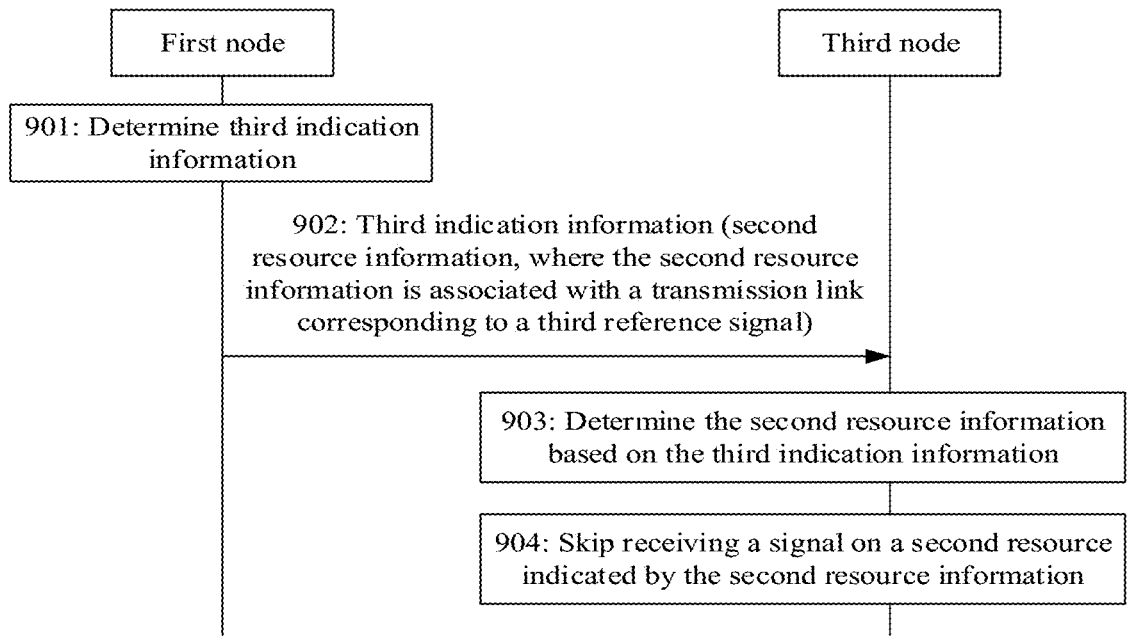
FIG. 12 is a schematic flowchart of still another resource indication method.

FIG. 12 is a schematic flowchart of still another resource indication method. A procedure of the method may include but is not limited to the following steps.

Step 901: A first node determines third indication information.

Step 902: The first node sends the third indication information to a third node. Correspondingly, the third node receives the third indication information from the first node.

Step 903: The first node sends the third indication information to the third node. Correspondingly, the third node receives the third indication information from the first node.

Step 904: The third node does not receive a signal on a second resource indicated by second resource information.

In the embodiment shown in FIG. 12, that the second resource information is associated with a third reference signal includes: The second resource information is associated with a transmission link corresponding to the third reference signal, or is associated with a device corresponding to the third reference signal. For a case in which the second resource information is associated with the transmission link corresponding to the third reference signal, refer to the case, in the embodiment shown in FIG. 9, in which the first resource information is associated with the transmission link corresponding to the first reference signal.

It may be understood that, in the embodiments shown in FIG. 5 and FIG. 11, resource information is associated with a beam corresponding to an interference signal; in the embodiments shown in FIG. 9 and FIG. 12, resource information is associated with a transmission link and/or a device corresponding to an interference signal.

In the embodiment shown in FIG. 12, the first node sends the third indication information to the third node, to prevent the third node from receiving the interference signal, such that network performance and spectrum efficiency can be improved. The second resource information in the third indication information is associated with the transmission link/device corresponding to the third reference signal, such that interference management in a space domain dimension can be implemented.

Figure 13:
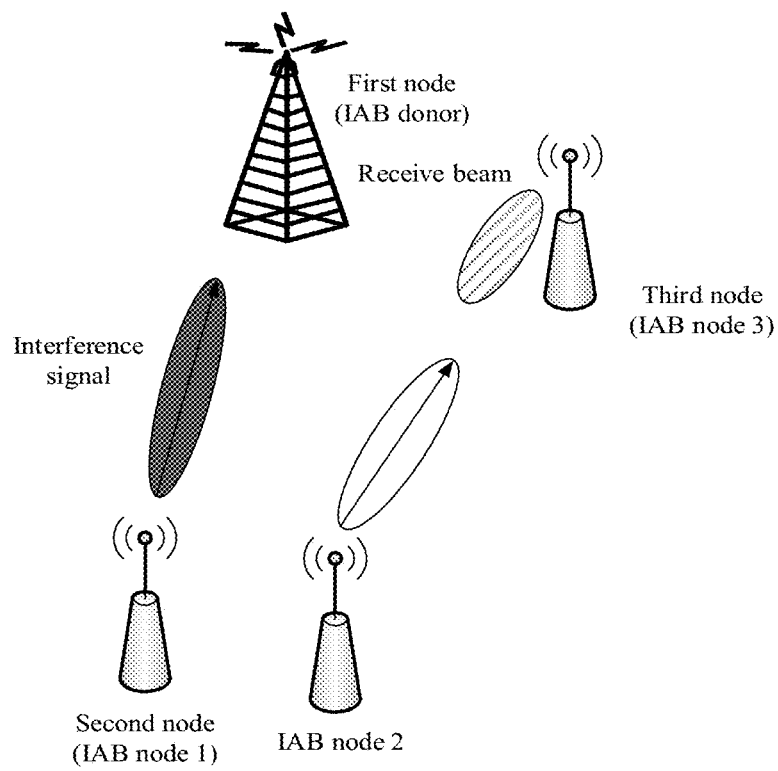
FIG. 13 is a schematic diagram of another scenario.

Refer to a schematic diagram of another scenario shown in FIG. 13. The schematic diagram of the scenario is applicable to the embodiments shown in FIG. 11 and FIG. 12. In FIG. 13, a first node is an IAB donor, a second node (an IAB node 1) is an interference source node, a third node (an IAB node 3) is an interfered node, and a signal sent by the second node to the first node may cause interference to signal receiving performed by the third node.

For example, in the embodiment shown in FIG. 11, the first node sends the third indication information to the third node, such that when receiving the receiving signal that has the QCL relationship with the interference signal, the third node does not receive the receiving signal using the receive beam corresponding to the interference signal. For example, in FIG. 13, the IAB node 3 receives the interference signal using a receive beam with oblique stripes, and a signal sent by an IAB node 2 to the third node has a QCL relationship with the interference signal. In this case, the third node may not receive, using the receive beam with the oblique stripes, the signal sent by the IAB node 2.

For example, in the embodiment shown in FIG. 12, the first node sends the third indication information to the third node, such that when receiving the receiving signal that has a QCL relationship with the interference signal, the third node does not receive the receiving signal through the transmission link identified by a transmission link identifier.

In the embodiments shown in FIG. 11 and FIG. 12, the first node indicates, using the third indication information, the third node to avoid the second resource information associated with the third reference signal. In other words, the first node explicitly indicates, using the third indication information, the third node how to avoid receiving the signal that may cause interference to the third node. In another embodiment, the third indication information indicates that the third reference signal and the receiving signal have the QCL relationship, but whether the third node avoids receiving the receiving signal that may cause interference to the third node and how the third node avoids receiving the receiving signal are autonomously determined by the third node and are not limited by the third indication information. It may be understood that, in this embodiment, the third indication information indicates that the receiving signal and the interference signal have the QCL relationship, but whether the receiving signal is received and how to avoid receiving the receiving signal are autonomously determined by the third node.

In an implementation, when receiving the third indication information, the third node still receives, on the second resource for receiving the third reference signal, the signal that has the QCL relationship with the third reference signal.

In an implementation, when receiving the third indication information, the third node determines a third resource, where the third resource is for receiving the signal that has the QCL relationship with the third reference signal, and there is no intersection between the third resource and the second resource for receiving the third reference signal. For example, when receiving the third indication information, the third node autonomously selects a receive beam that is different from the receive beam corresponding to the interference signal to receive the signal, and the signal and the interference signal have the QCL relationship.

In an implementation, when receiving the third indication information, the third node determines a third resource, where the third resource is for receiving the signal that has the QCL relationship with the third reference signal, and there is a partial intersection between the third resource and the second resource for receiving the third reference signal. The partial intersection may indicate that resources of a specific type are completely the same, or resources of a specific type are partially the same. For example, a frequency domain resource for receiving the signal and a frequency domain resource for receiving the third reference signal completely or partially overlap.

The foregoing three implementations are merely used as examples. An operation performed by the third node after the third node receives the third indication information is autonomously determined by the third node.

In correspondence to the methods provided in the foregoing method embodiments, this disclosure further provides corresponding communication apparatuses. The communication apparatus includes a corresponding module configured to perform the foregoing embodiment. The module may be software, hardware, or a combination of software and hardware.

Figure 14:
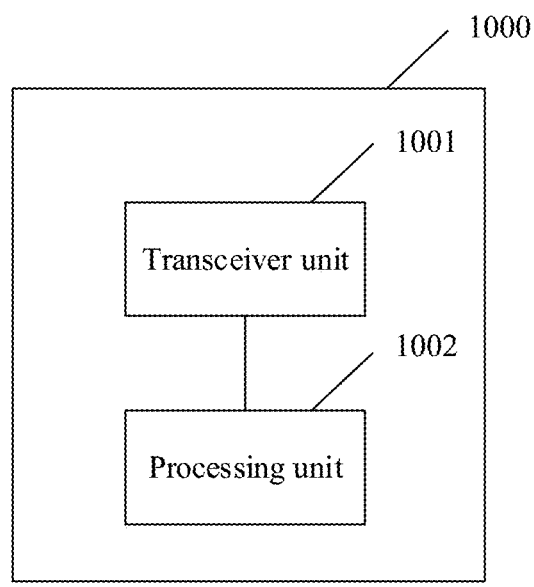
FIG. 14 is a schematic diagram of a structure of a communication apparatus.

FIG. 14 is a schematic diagram of a structure of a communication apparatus. The communication apparatus 1000 shown in FIG. 14 may include a transceiver unit 1001 and a processing unit 1002. The transceiver unit 1001 may include a sending unit and a receiving unit. The sending unit is configured to implement a sending function, and the receiving unit is configured to implement a receiving function, such that the transceiver unit 1001 may implement the sending function and/or the receiving function. The transceiver unit may alternatively be described as a communication unit.

The communication apparatus 1000 may be a second node, an apparatus in the second node, or an apparatus that can be used together with the second node.

In a design, the transceiver unit 1001 is configured to receive first indication information from a first node, where the first indication information includes first resource information, and the first resource information is associated with a first reference signal; and the processing unit 1002 is configured to determine the first resource information based on the first indication information, where the first resource information is for limiting sending of a to-be-sent signal on a first resource indicated by the first resource information.

The communication apparatus 1000 may be a first node, an apparatus in the first node, or an apparatus that can be used together with the first node.

In a design, the processing unit 1002 is configured to determine first indication information; and the transceiver unit 1001 is configured to send the first indication information to at least one second node, where the first indication information includes first resource information, the first resource information is associated with a first reference signal, and the first resource information is for limiting sending of a to-be-sent signal by the at least one second node on a first resource indicated by the first resource information.

Optionally, the processing unit 1002 is further configured to determine third indication information; and the transceiver unit 1001 is further configured to send the third indication information to a third node.

The communication apparatus 1000 may be a third node, an apparatus in the third node, or an apparatus that can be used together with the third node.

In a design, the transceiver unit 1001 is configured to receive third indication information from a first node, where the third indication information includes second resource information, and the second resource information is associated with a third reference signal; and the processing unit 1002 is configured to determine the second resource information based on the third indication information, where the second resource information is for limiting receiving of a signal by the third node on a second resource indicated by the second resource information.

Figure 15:
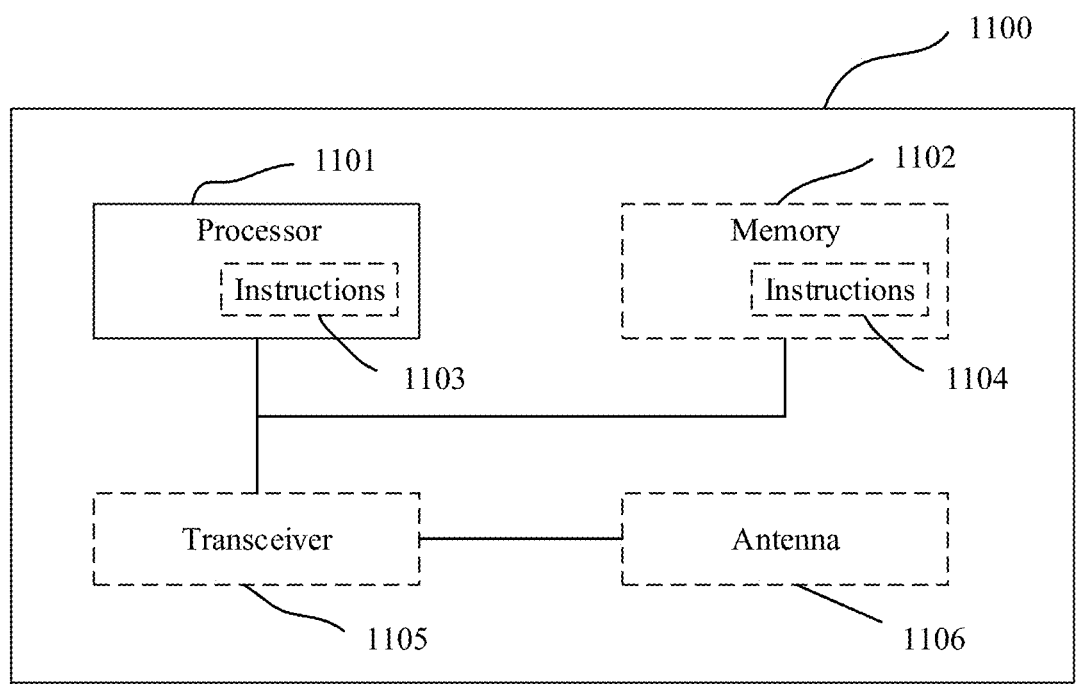
FIG. 15 is a schematic diagram of a structure of another communication apparatus.

FIG. 15 is a schematic diagram of a structure of a communication apparatus 1100. The communication apparatus 1100 may be a first node, a second node, or a third node. The communication apparatus 1100 may alternatively be a chip, a chip system, a processor, or the like that supports the first node in implementing the foregoing methods; a chip, a chip system, a processor, or the like that supports the second node in implementing the foregoing methods; or a chip, a chip system, a processor, or the like that supports the third node in implementing the foregoing methods. The communication apparatus may be configured to implement the methods described in the foregoing method embodiments. For details, refer to the descriptions in the foregoing method embodiments.

The communication apparatus 1100 may include one or more processors 1101. The processor 1101 may be a general-purpose processor, a dedicated processor, or the like. For example, the processor 1101 may be a baseband processor or a central processing unit. The baseband processor may be configured to process a communication protocol and communication data. The central processing unit may be configured to: control a communication apparatus (for example, a base station, a baseband chip, a terminal device, a terminal chip, a DU, or a CU), execute a software program, and process data of the software program.

Optionally, the communication apparatus 1100 may include one or more memories 1102 that may store instructions 1104. The instructions 1104 may be run on the processor 1101, such that the apparatus 1100 is enabled to perform the method described in the foregoing method embodiments. Optionally, the memory 1102 may further store data. The processor 1101 and the memory 1102 may be disposed separately, or may be integrated together.

Optionally, the communication apparatus 1100 may further include a transceiver 1105 and an antenna 1106. The transceiver 1105 may be referred to as a transceiver unit, a transceiver machine, a transceiver circuit, or the like, and is configured to implement a transceiver function. The transceiver 1105 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. When the communication apparatus 1100 is an IAB node, an MT and a DU included in the IAB node may share a transceiver and an antenna, or may use different transceivers and antennas.

In a design, the communication apparatus 1100 is the first node. The processor 1101 is configured to perform step 501 in FIG. 5, step 701 in FIG. 9, step 801 in FIG. 11, or step 901 in FIG. 12. The transceiver 1105 is configured to perform step 502 in FIG. 5, step 601, step 603, and step 605 in FIG. 6, step 702 in FIG. 9, step 802 in FIG. 11, or step 902 in FIG. 12.

In a design, the communication apparatus 1100 is the second node. The processor 1101 is configured to perform step 503 in FIG. 5, or step 703 in FIG. 9. The transceiver 1105 is configured to perform step 502, step 504a, and step 504b in FIG. 5, step 602 in FIG. 6, or step 702, step 704a, and step 704b in FIG. 9.

In a design, the communication apparatus 1100 is the third node. The processor 1101 is configured to perform step 604 in FIG. 6, step 803 in FIG. 11, or step 903 in FIG. 12. The transceiver 1105 is configured to perform step 603 and step 605 in FIG. 6, step 802 and step 804 in FIG. 11, or step 902 and step 904 in FIG. 12.

In another optional design, the processor 1101 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, optionally, the processor 1101 may store instructions 1103. When the instructions 1103 are run on the processor 1101, the apparatus 1100 is enabled to perform the method described in the foregoing method embodiments. The instructions 1103 may be fixed in the processor 1101. In this case, the processor 1101 may be implemented by hardware.

In still another possible design, the communication apparatus 1100 may include a circuit, and the circuit may implement a sending function, a receiving function, or a communication function in the foregoing method embodiments. The processor and the transceiver may be implemented on circuits such as an integrated circuit (IC), an analog IC, a radio frequency integrated circuit (RFIC), a hybrid signal IC, an application-specific integrated circuit (ASIC), a printed circuit board (PCB), and an electronic device. The processor and the transceiver may alternatively be manufactured using various IC process technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), gallium arsenide (GaAs), and the like.

The communication apparatus described in the foregoing embodiment may be a network device or a terminal device. However, a scope of the communication apparatus described is not limited thereto, and a structure of the communication apparatus may not be limited by FIG. 15. The communication apparatus may be an independent device or may be a part of a large device. For example, the communication apparatus may be:

(1) an independent integrated circuit IC, a chip, or a chip system or subsystem;

(2) a set including one or more ICs, where optionally, the IC set may further include a storage component configured to store data and instructions;

(3) an ASIC, for example, a modem;

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) another device, or the like.

Figure 16:
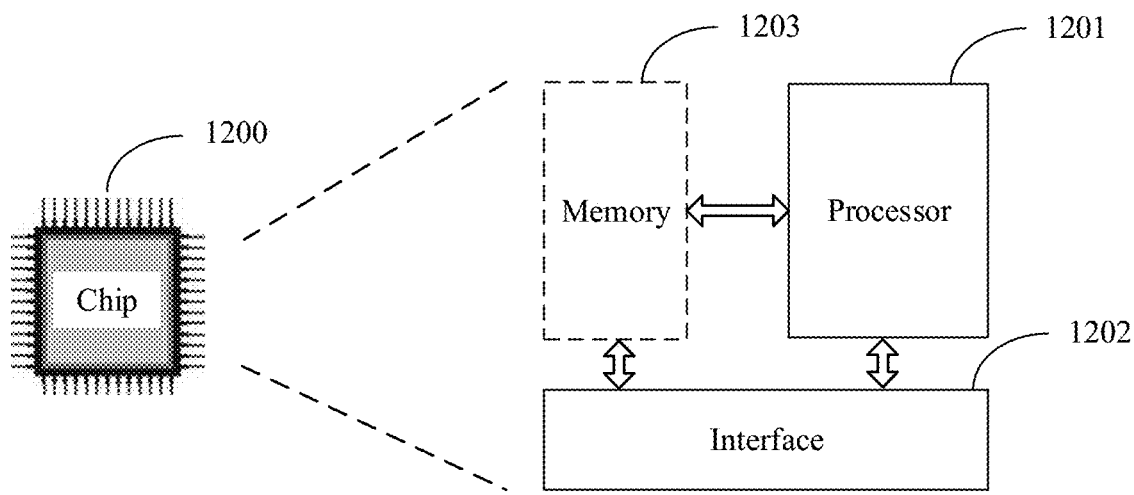
FIG. 16 is a schematic diagram of a structure of a chip.

For a case in which the communication apparatus is a chip or a chip system, refer to a schematic diagram of a structure of a chip shown in FIG. 16. The chip 1200 shown in FIG. 16 includes a processor 1201 and an interface 1202. There may be one or more processors 1201, and there may be a plurality of interfaces 1202.

When the chip is configured to implement the second node or the third node as a terminal device, the interface 1202 is configured to receive downlink information, a downlink signal, or the like, for example, receive first indication information or third indication information. The processor 1201 is configured to process information, data, or a signal. The interface 1202 is further configured to output a signal and the like.

Optionally, the chip further includes a memory 1203, where the memory 1203 is configured to store program instructions and data that are necessary for the terminal device.

Figure 17:
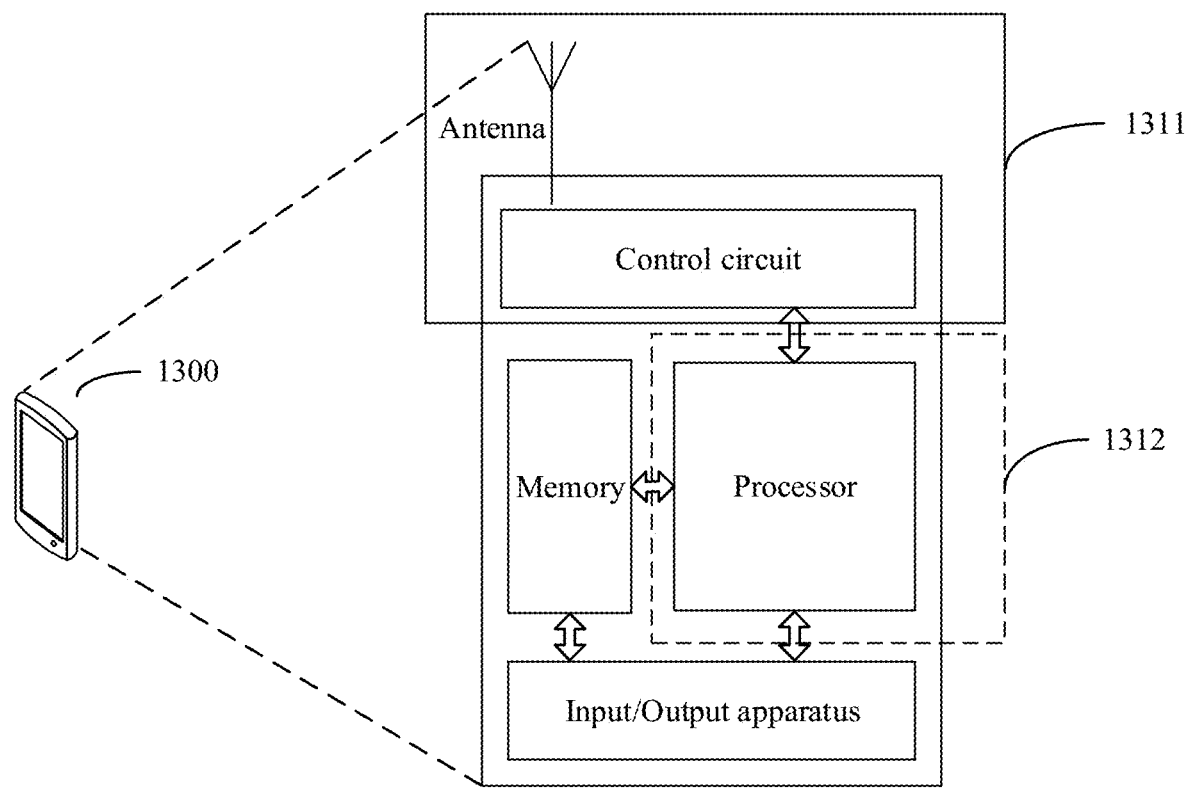
FIG. 17 is a schematic diagram of a structure of a terminal device.

The second node and the third node may be terminal devices. FIG. 17 is a schematic diagram of a structure of a terminal device 1300. For ease of description, FIG. 17 shows only main components of the terminal device 1300. As shown in FIG. 17, the terminal device 1300 includes a processor, a memory, a control circuit, an antenna, and an input/output apparatus. The processor is mainly configured to: process a communication protocol and communication data, control the entire terminal device, execute a software program, and process data of the software program. The memory is mainly configured to store the software program and the data. The control circuit may include a radio frequency circuit, and the radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display screen, or a keyboard, is mainly configured to receive data input by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form using the antenna. When data is sent to the terminal device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 17 shows only one memory and one processor. An actual terminal device may include a plurality of processors and a plurality of memories. The memory may also be referred to as a storage medium, a storage device, or the like. This is not limited.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 17 integrates functions of the baseband processor and the central processing unit. A person skilled in the art may understand that the baseband processor and the central processing unit may alternatively be processors independent of each other, and are interconnected using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

A person skilled in the art may further understand that various illustrative logical blocks (illustrative logical block) and steps (step) that are listed may be implemented using electronic hardware, computer software, or a combination thereof. Whether the functions are implemented using hardware or software depends on particular applications and a design requirement of an entire system. A person skilled in the art may use various methods to implement the functions for each particular application, but it should not be considered that the implementation goes beyond the protection scope of this disclosure.

This disclosure further provides a computer-readable storage medium. The computer-readable storage medium stores a computer program. When the computer program is executed by a computer, the method in any one of the foregoing method embodiments may be implemented.

This disclosure further provides a computer program product. When the computer program product is executed by a computer, the method in any one of the foregoing method embodiments may be implemented.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

A person of ordinary skill in the art may understand that various numerals such as "first" and "second" are merely used for differentiation for ease of description, and are not used to limit the scope of this disclosure or represent a sequence.

The correspondences shown in the tables may be configured, or may be predefined. Values of the information in the tables are only examples, and other values may be configured. This is not limited. When a correspondence between information and each parameter is configured, not all correspondences shown in the tables need to be configured. For example, in the tables, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" may be understood as "define", "predefine", "store", "pre-store", "pre-negotiate", "pre-configure", "solidify", "pre-burn", or the like.

A person of ordinary skill in the art may be aware that, in combination with the units and algorithm steps in the examples described in the embodiments disclosed in this specification, this disclosure can be implemented using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that for the purpose of convenient and brief description, for a detailed working process of the described system, apparatus, and unit, refer to a corresponding process in the foregoing method embodiment. Details are not described herein again.

The foregoing descriptions are merely example, but are not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claims.

What is claimed is:

1. A second node in a communication system and comprising:
   a memory configured to store instructions; and
   a processor coupled to the memory and configured to execute the instructions to cause the second node to:
      receive first indication information from a first node in the communications system, wherein the first indication information comprises first resource information, wherein the first resource information is associated with a first reference signal, is for limiting sending of a to-be-sent signal on a first resource indicated by the first resource information, and comprises space domain resource information, and wherein the space domain resource information comprises a peer device identifier of the second node or a transmission link identifier; and
      obtain the first resource information from the first indication information.

2. The second node of claim 1, wherein the first resource information indicates that the to-be-sent signal is not allowed to be sent on the first resource.

3. The second node of claim 1, wherein limiting sending of the to-be-sent signal comprises:
   sending the to-be-sent signal based on the first resource at a first transmit power less than a threshold;
   sending the to-be-sent signal based on the first resource at a second transmit power that is less than a third transmit power for sending a second reference signal; or
   sending the to-be-sent signal based on an offset from the third transmit power and based on the first resource.

4. The second node of claim 1, wherein the first resource information comprises second indication information, wherein the second indication information indicates that the first reference signal and the to-be-sent signal have a quasi co-location (QCL) relationship, and wherein the QCL relationship is for limiting the sending of the to-be-sent signal on the first resource.

5. The second node of claim 1, wherein the first resource information further comprises time domain resource information or frequency domain information.

6. The second node of claim 1, wherein the space domain resource information further comprises a port identifier.

7. The second node of claim 1, wherein the first resource information is associated with the first reference signal by being associated with a device corresponding to the first reference signal, and wherein the first resource information is further associated with a transmission link corresponding to the first reference signal.

8. The second node of claim 1, wherein the first indication information further comprises a cell identifier or a reference signal identifier identifying the first reference signal.

9. A first node in a communication system and comprising:
- a memory configured to store instructions; and
- one or more processors coupled to the memory and configured to execute the instructions to cause the first node to:
  - determine first indication information comprising first resource information, wherein the first resource information is associated with a first reference signal, is for limiting sending of a to-be-sent signal on a first resource indicated by the first resource information, and comprises space domain resource information, and wherein the space domain resource information comprises a peer device identifier of a second node in the communication system or a transmission link identifier; and
  - send the first indication information to the second node.

10. The first node of claim 9, wherein the first resource information indicates that the to-be-sent signal is not allowed to be sent on the first resource.

11. The first node of claim 9, wherein limiting sending of the to-be-sent signal comprises:
- sending the to-be-sent signal based on the first resource at a first transmit power less than a threshold;
- sending the to-be-sent signal based on the first resource at a second transmit power that is less than a third transmit power for sending a second reference signal; or
- sending the to-be-sent signal based on an offset from the third transmit power and based on the first resource.

12. The first node of claim 9, wherein the first resource information comprises second indication information, wherein the second indication information indicates that the first reference signal and the to-be-sent signal have a quasi co-location (QCL) relationship, and wherein the QCL relationship is for limiting the sending of the to-be-sent signal by the second node on the first resource.

13. The first node of claim 9, wherein the first resource information further comprises time domain resource information or frequency domain information.

14. The first node of claim 9, wherein the space domain resource information further comprises a port identifier.

15. The first node of claim 9, wherein the first resource information is associated with the first reference signal by being associated with a device corresponding to the first reference signal, and wherein the first resource information is further associated with a transmission link corresponding to the first reference signal.

16. The first node of claim 9, wherein the first indication information further comprises a cell identifier or a reference signal identifier identifying the first reference signal.

17. A resource indication method implemented by a second node in a communication system, wherein the resource indication method comprises:
- receiving first indication information from a first node in the communications system, wherein the first indication information comprises first resource information, wherein the first resource information is associated with a first reference signal, is for limiting sending of a to-be-sent signal on a first resource indicated by the first resource information, and comprises space domain resource information, and wherein the space domain resource information comprises a a peer device identifier of the second node or a transmission link identifier; and
- obtaining the first resource information from the first indication information.

18. The resource indication method of claim 17, wherein the first resource information indicates that the to-be-sent signal is not allowed to be sent on the first resource.

19. The resource indication method of claim 17, wherein limiting sending of the to-be-sent signal comprises:
- sending the to-be-sent signal based on the first resource at a first transmit power less than a threshold;
- sending the to-be-sent signal based on the first resource at a second transmit power that is less than a third transmit power for sending a second reference signal; or
- sending the to-be-sent signal based on an offset from the third transmit power and based on the first resource.

20. The resource indication method of claim 17, wherein the first resource information comprises second indication information, wherein the second indication information indicates that the first reference signal and the to-be-sent signal have a quasi co-location (QCL) relationship, and wherein the QCL relationship is for limiting the sending of the to-be-sent signal on the first resource.

* * * * *